(12) United States Patent
Ackland et al.

(10) Patent No.: US 10,628,678 B2
(45) Date of Patent: Apr. 21, 2020

(54) CLASSIFICATION OF ACTIVITY DERIVED FROM MULTIPLE LOCATIONS

(71) Applicant: Performance Lab Technologies Limited, Auckland (NZ)

(72) Inventors: Jonathan Edward Bell Ackland, Auckland (NZ); Mark Nayler, Auckland (NZ)

(73) Assignee: Performance Lab Technologies Limited, Auckland (NZ)

( * ) Notice: Subject to any disclaimer, the term of this patent is extended or adjusted under 35 U.S.C. 154(b) by 0 days.

(21) Appl. No.: 16/438,030

(22) Filed: Jun. 11, 2019

(65) Prior Publication Data

US 2019/0294882 A1    Sep. 26, 2019

Related U.S. Application Data

(63) Continuation of application No. 16/002,271, filed on Jun. 7, 2018, now Pat. No. 10,372,992, which is a (Continued)

(30) Foreign Application Priority Data

Nov. 8, 2013    (NZ) ................ 20130617510

(51) Int. Cl.
*G06N 3/00*    (2006.01)
*G06K 9/00*    (2006.01)
(Continued)

(52) U.S. Cl.
CPC ....... *G06K 9/00724* (2013.01); *G06K 9/6202* (2013.01); *G06K 9/627* (2013.01); *G06T 7/74* (2017.01); *G06T 2207/30196* (2013.01)

(58) Field of Classification Search
CPC .............. A63B 2024/0025; A63F 3/00
(Continued)

(56) References Cited

U.S. PATENT DOCUMENTS

| 5,297,558 A | 3/1994 | Acorn |
| 6,554,776 B1 * | 4/2003 | Snow .............. A61B 5/222 482/9 |

(Continued)

FOREIGN PATENT DOCUMENTS

| WO | 2008033338 | 3/2008 |
| WO | 2010036456 | 4/2010 |

(Continued)

OTHER PUBLICATIONS

European Search Report issued by the European Patent Office Application No. 11747774.5 dated Apr. 28, 2016, 8 pages.

(Continued)

*Primary Examiner* — Abolfazl Tabatabai
(74) *Attorney, Agent, or Firm* — Lowenstein Sandler LLP

(57) ABSTRACT

The technology provides a method and system of analyzing a sporting activity. An example of the technology involves one or more processors receiving location data associated with a first player and location data associated with a second player, wherein the location data of the first player and the location data of the second player are derived from one or more sensor devices; detecting a game event associated with the first player; determining, in view of the received location data, a plurality of locations of the first player and at least one location of the second player; and classifying the game event based on the plurality of locations of the first player and the at least one location of the second player.

30 Claims, 21 Drawing Sheets

Related U.S. Application Data continuation of application No. 15/035,086, filed as application No. PCT/NZ2014/050009 on Nov. 10, 2014, now Pat. No. 10,025,987.

(51) Int. Cl.
 *G06T 7/73* (2017.01)
 *G06K 9/62* (2006.01)
 *A63B 47/00* (2006.01)

(58) Field of Classification Search
 USPC .......................................................... 382/103
 See application file for complete search history.

(56) References Cited

U.S. PATENT DOCUMENTS

| | | | |
|---|---|---|---|
| 6,705,972 B1 | 3/2004 | Takano et al. | |
| 7,254,516 B2* | 8/2007 | Case, Jr. ............. | A63B 24/0062 |
| | | | 702/182 |
| 7,275,986 B2 | 10/2007 | Mori | |
| 7,827,000 B2 | 11/2010 | Stirling et al. | |
| 8,177,634 B2 | 5/2012 | Herrman | |
| 8,187,182 B2* | 5/2012 | Kahn ................... | A61B 5/1038 |
| | | | 600/300 |
| 8,566,272 B2 | 10/2013 | Fukumoto et al. | |
| 8,651,961 B2 | 2/2014 | Muller | |
| 8,718,672 B2 | 5/2014 | Xie et al. | |
| 8,977,522 B2 | 3/2015 | Jallon | |
| 2004/0043869 A1 | 3/2004 | Sato et al. | |
| 2005/0033200 A1 | 2/2005 | Soehren | |
| 2005/0172311 A1 | 8/2005 | Hjelt et al. | |
| 2006/0063980 A1 | 3/2006 | Hwang et al. | |
| 2006/0172859 A1 | 8/2006 | Davis | |
| 2007/0010720 A1 | 1/2007 | Mott | |
| 2007/0135264 A1 | 6/2007 | Rosenberg | |
| 2007/0219059 A1 | 9/2007 | Schwartz et al. | |
| 2007/0232455 A1 | 10/2007 | Hanoun | |
| 2008/0096726 A1 | 4/2008 | Riley et al. | |
| 2009/0047645 A1 | 2/2009 | Dibenedetto | |
| 2009/0063099 A1 | 3/2009 | Counts et al. | |
| 2009/0275442 A1 | 11/2009 | Nissila | |
| 2009/0319221 A1 | 12/2009 | Kahn et al. | |
| 2010/0113152 A1* | 5/2010 | Shmuel ................. | A63F 13/10 |
| | | | 463/36 |
| 2010/0137106 A1 | 6/2010 | Oshima et al. | |
| 2010/0292599 A1 | 11/2010 | Oleson et al. | |
| 2011/0152695 A1 | 6/2011 | Granqvist | |
| 2011/0152696 A1 | 6/2011 | Ryan | |
| 2012/0010478 A1 | 1/2012 | Kinnunen et al. | |
| 2012/0221254 A1 | 8/2012 | Kateraas et al. | |
| 2012/0316455 A1 | 12/2012 | Rahman et al. | |
| 2013/0041590 A1 | 2/2013 | Burich et al. | |
| 2013/0053990 A1 | 2/2013 | Ackland | |
| 2015/0116501 A1 | 4/2015 | McCoy | |
| 2015/0131845 A1 | 5/2015 | Forouhar et al. | |

FOREIGN PATENT DOCUMENTS

| | | |
|---|---|---|
| WO | 2011105914 | 9/2011 |
| WO | 2013166456 | 11/2013 |

OTHER PUBLICATIONS

B. Harrison, S. Consalvo, & T. Choudhury. "Using Multi-Modal Sensing for Human Activity Modeling in the Real World," In H. Nakashima, H. Aghajan, & J.C. Augusto (Eds.) Handbook of Ambient Intelligence and Smart Environments, Springer Verlag, Part IV, (2009), pp. 463-478.

International Search Report for International Patent Application No. PCT/NZ2011/000029 dated May 9, 2011, 4 pages.

European Search Report issued by the European Patent Office for Application No. 14859524.2, dated Jun. 21, 2017, 8 pages.

European Search Report issued by the European Patent Office for Application No. 1489933.5, dated May 26, 2017, 8 pages.

\* cited by examiner

CLASSIFICATION OF ACTIVITY DERIVED FROM MULTIPLE LOCATIONS

CROSS-REFERENCE TO RELATED APPLICATIONS

This application is a continuation of U.S. patent application Ser. No. 16/002,271, filed Jun. 7, 2018, which is a continuation of U.S. patent application Ser. No. 15/035,086, filed May 6, 2016, which is a National Phase entry of PCT/NZ2014/050009, filed Nov. 10, 2014, which claims the benefit of priority to New Zealand Patent Application No. 20130617510, filed Nov. 8, 2013, the contents of each being hereby incorporated by reference herein in their entireties.

FIELD OF INVENTION

The invention relates to exercise and/or activity monitoring and in particular to the classification and analysis of activity/exercise data for field or court team sports like Soccer, Rugby union and league, Basketball, Hockey, American Football, Lacrosse, and Handball.

BACKGROUND

Exercise and activity devices that measure biometric and environmental data for field team sports such as heart rate, speed, stride rate, altitude, temperature, power, distance per stride, location, acceleration, direction the user is facing, distance, time and other parameters currently exist. This data is displayed on a watch or device screen, or logged on a data recorder.

There are also video logging systems where occurrences within a recorded game can be identified and labelled manually by an expert coach for later use in demonstrating various situations to players.

The state of the art has developed further where multiple video cameras can be pointed at a playing field for soccer or a court for basketball as examples and algorithms can triangulate the location of each player and the ball on the field many times a second for an entire game.

Still further advancements have occurred where data on the location and other physical, physiological and environmental data which can also be transmitted from each player to a base station on the side of the field in real time.

There are now also sensors in the ball that can relay data to a base station or to a user's watch during play.

The difficulty is that these systems generate hundreds of thousands of data points per player per game. For example, location sensing camera systems generate location data at 25 frames per second; 135,000 data points for x axis and 135,000 y axis data points to locate a player for a 90 minute soccer match. GPS used in practice for team sports generate 10,800 latitude and longitude data points during a practice per player. For an 11 man team that is 2,970,000 and 118,800 data points respectively per team per game. Analysing a season of the English Premier League consisting of 38 games amounts to 112,860,000 data points if no substitutes are used. Analysis and processing of this data is very time consuming and very difficult to use in a real time situation.

Faced with this amount of data most coaches and sports analysts do not use or use very little information supplied by sports statistics companies.

There have been a number of patents and patent applications around trying to solve this problem and problems like it.

Orenstein in U.S. Pat. No. 6,270,433 discloses a system for automatically determining the occurrence of off side which involves detection of players relative to one another and the ball in the confines of a soccer field. This system is specifically focused around using player and object tracking technology to determine referee associated events such as the game object leaving the playing area and off side infractions.

They are not associated to determining player or team performance abilities.

Daver in U.S. Pat. No. 5,513,854 describes a system and process for acquiring and processing position and/or physical performance data of one or more persons and a ball on a game field. The system discloses a system for capturing in real time, the instantaneous position of multiple players and a ball using transmitters on the ball and individual players. Together with digital imaging of the ball and players, it creates a set of digital values that describes the performances of every player based on their position and trajectory data over time. The patent also discloses the display of values and statistics on an interface.

While Daver determines the performances of every player, this does not use preconfigured automatic classifications to determine performance and is focused on physical performances rather than skills.

Min describes a system and process in WO 01/88826 for acquiring and processing position and/or physical performance of one or more persons on a game field. The system uses soccer game record data that is converted to location data for graphical display. Also disclosed is the selection of specific time periods by a user and the output of user defined formats such as name/number of the player passing or receiving the ball, type of pass, kind of event, goal success or fail and position of the player before shooting.

Min discloses post match analysis based on user selections of time periods and analysts types. Team sports 'events' are determined but this is post match and manual and does not use preconfigured automatic classifications to determine performance.

In WO 2008/033338, Aman describes a system and method for automatically determining the states of game object possession for sporting contests. The intended use is to determine possession and possession flow within sporting contests. This is achieved through the determination of location of each player and the game object such as a ball on the playing area such as a playing field, rink, or court. This together with determining the state of play within a specific area and within a specific radius of each player. Statistics are automatically presented concerning possession events related to the location of each player.

This system discloses determination of possession and statistics related to changes in game possession of the game object.

It does not automatically identify skill events based on preconfigured classifications of multiple location thresholds of multiple players and a game object like a ball or puck.

Seacat in US 2008/0140233 discloses a method and apparatus for analysing team effectiveness based on information from an ongoing sports game. The system automatically analyses team effectiveness by transmitting location data on at least some of the players to a computer which processes the data in real time.

This system is focused on team effectiveness rather than the skill classification of an individual player within a team.

In U.S. Pat. No. 7,580,912, Carlbon describes a performance data mining system combining sensor and other data to discover interesting patterns and rules for performance.

The system processes data captured during and associated with an event, where data comprises motion data of one or more objects and people to discover one or more attributes of the objects or people that are associated with the outcome of the event. The attributes are not predetermined to be associated with the outcome of the event and these attributes comprise style, strategy and performance. This patent is focused on discovering the relationship between attributes and outcomes rather than classifying skills based on pre-determined parameters.

House describes in US 2010/0030350 a system for generating and analysing information for an athletic event. The system gathers data from multiple objects including players and game objects such as balls or pucks together with aspect data for objects such as location and motion and determines a data representation with respect to the aspects of the different objects.

This system is focused on the relationship between aspects of multiple objects to create statistics rather than classifying skills of an individual player based on predetermined parameters.

The prior art does not use pre-determined classifications based on location pattern geo spatial groupings/relationships of multiple players and the game object such as a ball or puck.

Further the state of the art does not refer to the automatic determination through predetermined classifications of an individual team position or players skills with respect to the sports game being analysed.

Automated Classifications of various player skills within the team dependent on a game situation save the coach, trainer or sports analyst the effort of working through the processing of large amounts of data manually thus reducing time and effort.

Automated skill classification not only saves time but also meaningful analysis can be conducted in real time during a game or practice.

Automated skill classification augments coaching significantly. Coaching is primarily concerned with identifying the biggest performance problems for a player and setting 'training' to improve them. The higher the degree of accuracy in diagnosing performance issues, the more individualised the future prescribed training activities with respect to the player. This results in greater and more rapid the improvement in game ability.

Coaches prefer to deal with issues that are 'real'. They prefer to take game events where possession, field position, tactical advantage or points were lost or gained and find out why they occurred. Classifications where each of these positive and negative situations is compartmentalised with all the relevant data for more intense analysis as mentioned above is key to interpreting the many possible issues that may occur in a game.

If a game event occurs, ideally all data relevant to the situation is captured, analysed and interpreted to aid the coach.

While previous systems can be used to define assists, passes and goals for example, they are unable to automatically characterise the quality of the assist, pass or goal. The point of this classification system is to look at team and player skills at a far more detailed level than the previous state of the art Without detailed identification of various game events like goals, assists, passes and tackles, statistics are produced but these statistics do not adequately characterise the quality of a players skills.

Without a clear and detailed understanding of the quality of a player's skills, it is difficult to make judgements on tactical scenarios real time in-game and it is also very difficult to provide adequate coaching feedback to players for training to promote performance improvement.

It is an object of the present invention to provide a method and system for enhancing classification and interpretation of activities that occur in team sports games by combining multiple game parameters most particularly distance that a player is from the ball and from other players and their location on the field to provide a clearer determination of the physical, physiological, technical and tactical aspects of team sports, or to at least provide the public with a useful choice.

SUMMARY OF THE INVENTION

In an embodiment the invention comprises method of analysing a sporting activity. The method comprises receiving location data associated to a first player; receiving location data associated to a game object; receiving location data associated to a second player; determining a relative location of the first player in relation to the game object location and the second player location, at least partly from the received location data associated to the first player, the game object and/or the second player; comparing the determined relative location of the first player with a set of reference relative locations of the first player; and determining a match between the determined relative location of the first player and at least one reference relative location of the first player.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

Preferably the received location data associated to the first player, the game object, and/or the second player includes location data of the first player, the game object, and/or the second player respectively in relation to a playing area.

Preferably the received location data associated to the first player, the game object, and/or the second player in relation to the playing area comprises at least one set of location values within a coordinate system.

Preferably the playing area is generally rectangular in shape, the playing area having four corners, the coordinate system centred on a location of a corner of the playing area.

Preferably the at least one set of location values represents a location in two dimensions in relation to a reference plane.

Preferably the at least one set of location values represents a location in three dimensions in relation to a reference plane.

Preferably the relative location of the first player includes a distance between the first player and the second player.

Preferably the relative location of the first player includes a first distance between the first player and the second player at a first timestamp; and a second distance between the first player and the second player at a second timestamp.

Preferably the relative location of the first player includes a change between the first distance and the second distance.

Preferably the relative location of the first player includes at least one set of location values within a coordinate system centred on a location of the second player in relation to the playing area.

Preferably the relative location of the first player includes a distance between the first player and the game object.

Preferably the relative location of the first player includes a first distance between the first player and the game object at a first timestamp; and a second distance between the first player and the game object at a second timestamp.

Preferably the relative location of the first player includes a change between the first distance and the second distance.

Preferably the relative location of the first player includes at least one set of location values within a coordinate system centred on a location of the game object in relation to the playing area.

Preferably the set of reference relative locations includes a plurality of location values within a coordinate system.

Preferably the set of desired relative locations represents a set of location values within a threshold tolerance from a reference location.

Preferably the at least one reference relative location is associated to at least one desired relative location of the first player.

Preferably the at least one reference relative location is associated to at least one game event.

Preferably the first player is associated to a first team participating in the sporting activity acid the second player is associated to a second team participating in the sporting activity.

Preferably the first team and the second team are the same.

Preferably the first team and the second team are different.

Preferably the method further comprises receiving, in relation to the sporting activity, one or more of effort parameters; physiological status; postural status; biomechanical status; and environmental status.

Preferably the received location data associated to the first player and/or second player includes data obtained from at least one device worn by the first player, the second player, or the first player and second player respectively.

Preferably the at least one device includes a memory configured to store location data.

Preferably the at least one device includes a transmitter configured to transmit location data to a base station.

Preferably the received location data associated to the first player, the second player, and/or the game object includes data obtained from a plurality of video cameras.

Preferably the received location data associated to the first player, the game object and/or the second player is associated to a live sporting activity.

Preferably the received location data associated to the first player, the game object and/or the second player is associated to an historical sporting activity.

Preferably the game object comprises an object the possession of which s desirable during the sporting activity.

Preferably the game object comprises a ball for use in a sporting activity.

Preferably the game object comprises a puck for use a sporting activity.

In an embodiment the invention comprises a tangible computer readable medium having stored thereon computer-executable instructions that, when executed by a processor, cause the processor to perform at least one method described herein.

In an embodiment the invention comprises a classification system. The classification system comprises a display; a processor; and a tangible computer readable medium having stored thereon computer-executable instructions that, when executed by a processor, cause the processor to perform at least one method described herein.

In an embodiment the invention comprises a classification system. The system comprises a data acquisition module adapted to receive location data associated to a first player; receive location data associated to a game object; and receive location data associated to a second player; a spatial engine adapted to determine a relative location of the first player in relation to the game object location and the second player location, at least partly from the received location data associated to the first player, the game object and/or the second player; and a classification engine adapted to compare the determined relative location of the first player with a set of reference relative locations of the first player, and determine a match between the determined relative location of the first player and at least one reference relative location of the first player.

Preferably the received location data associated to the first player, the game object, and/or the second player includes location data of the first player, the game object, and/or the second player respectively in relation to a playing area.

Preferably the received location data associated to the first player, the game object, and/or the second player in relation to the playing area comprises at least one set of location values within a coordinate system.

Preferably the playing area is generally rectangular shape, the playing area having four corners, the coordinate system centred on a location of a corner of the playing area.

Preferably the at least one set of location values represents a location in two dimensions relation to a reference plane.

Preferably the at least one set of location values represents a location in three dimensions in relation to a reference plane.

Preferably the relative location of the first player includes a distance between the first player and the second player.

Preferably the relative location of the first player includes a first distance between the first player and the second player at a first timestamp; and a second distance between the first player and the second player at a second timestamp.

Preferably the relative location of the first player includes a change between the first distance and the second distance.

Preferably the relative location of the first player includes at least one set of location values within a coordinate system centred on a location of the second player in relation to the playing area.

Preferably the relative location of the first player includes a distance between the first player and the game object.

Preferably the relative location of the first player includes a first distance between the first player and the game object at a first timestamp; and a second distance between the first player and the game object at a second timestamp.

Preferably the relative location of the first player includes a change between the first distance and the second distance.

Preferably the relative location of the first player includes at least one set of location values within a coordinate system centred on a location of the game object in relation to the playing area.

Preferably the set of reference relative locations includes a plurality of location values within a coordinate system.

Preferably the set of desired relative locations represents a set of location values within a threshold tolerance from a reference location.

Preferably the at least one reference relative location is associated to at least one desired relative location of the first player.

Preferably the at least one reference relative location is associated to at least one game event.

Preferably the first player is associated to a first team participating in the sporting activity and the second player is associated to a second team participating in the sporting activity.

Preferably the first team and the second team are the same.

Preferably the first team and the second team are different.

Preferably the data acquisition module is further adapted to receive, in relation to the sporting activity, one or more of effort parameters; physiological status; postural status; biomechanical status; and environmental status.

Preferably the received location data associated to the first player and/or second player includes data obtained from at least one device worn by the first player, the second player, or the first player and second player respectively.

Preferably the at least one device includes a memory configured to store location data.

Preferably the at least one device includes a transmitter configured to transmit location data to a base station.

Preferably the received location data associated to the first player, the second player, and/or the game object includes data obtained from a plurality of video cameras.

Preferably the received location data associated to the first player, the game object and/or the second player is associated to a live sporting activity.

Preferably the received location data associated to the first player, the game object and/or the second player is associated to an historical sporting activity.

Preferably the game object comprises an object the possession of which is desirable during the spotting activity.

Preferably the game object comprises a ball for use in a sporting activity.

Preferably the game object comprises a puck for use in a sporting activity.

Described herein is a method of analysing sporting activity in team sports comprising:
  receiving location and ball possession data on more than one player over a period of time or distance during a live or historical sporting activity, said data relating to multiple simultaneous location parameters of players and or the game object within a playing area during the game,
  and
  utilising a classification system to identify one or more events during the game based on the received activity data said data characterising a first player and at least a second player and game object locations in relation to one another within a coordinate system, a classification system defining an activity based on a set of threshold criteria with threshold tolerances for a combination of multiple relative location parameters.

Preferably the data is received in multiple data streams of consecutive data points, each stream relating to one of said monitored parameters, and utilizing said team sport classification system comprising:
  a) comparing corresponding data points of two or more data streams against the set of threshold criteria with threshold tolerances for one or more activities,
  b) identifying when the corresponding data points satisfy the threshold criteria for an activity and if satisfied classifying the corresponding data prints under the activity, and
  c) repeating steps a) and b) for other data points from the data streams to identify the one or more activities performed during the game or training session.

Preferably the step of utilizing the classification system further comprises grouping consecutive data points classified under the same activity to define an instance of the activity within the, live or historical sporting activity or training practice session, the number of consecutive data points being indicative of duration of the instance of the activity.

Preferably the step of utilizing the classification system is performed upon or after receiving the activity data for the entire historical game or training practice session.

Alternatively the activity data is received during the live sporting activity or game or training session and the step of utilizing the classification system is performed simultaneously during the live game or training session.

The activity data may be time, distance or location stamped by a user or someone externally during a game or training session to denote an instance of an activity and said method comprises receiving one or more time, distance or location stamped blocks of activity data and utilizing the classification system to identify an activity performed during one or more of the time, distance or location stamped blocks.

Preferably the multiple relative location parameters monitored are any combination of two or more player locations, the game objects location, and the location of the player or game object on the playing area and/or the possession of the game object.

Preferably the classification system monitors and analyses both teams.

Preferably measurements and classifications are made for both teams in both attacking events and in a defensive context.

Alternatively the classification system can be used to monitor and analyse a players defensive positioning in relation to the game object and other attacking and defensive players.

The measure of player relationships with each other may be a measure of the distance between players or the change in distance between players or the location of each player in relation to other players and the change in location between each player in relation to other players.

The measure of player and game object relationships with each other may be a measure of the distance between players and the game object or the change in distance between players and the game object or the location of each player in relation to the game object and the change in location between each player in relation to the game object.

The measure of possession may be a measure of the distance between the player and the game object or a change in distance between the player and the game object or the location of each player in relation to the game object or the change in the location of the object with each player.

Preferably the classification is in relation to a first player or reference player or playing position. The classification is determined based on the geo spatial relationship between the first player or reference player and at least a second player, the first player and the location of the game object such as a ball, other players and the ball, the game object's location within a coordinate system, the first player and their location within a coordinate system on the playing area and other players and their location on the playing area within a coordinate system.

Preferably in some cases the classification is also related to a game event such as a goal, try, touchdown or basket where a score is initiated or where the game object such as a ball goes outside the boundaries of the playing area. The game event initiates the search for the possible location classification of the players and the game object just preceding or at the same time as the game event.

Other parameters that mar be combined in a classification of a game event include physiological status, postural status, biomechanical status and environmental status such as heart rate, speed, power, stride rate, acceleration, stride length, direction a player is facing, height of a known location on the player from the ground, player impacts, time in possession, acceleration of the ball, number of touches (where the player was in possession of the game object), identification of the player that touched the game object immediately before or after the analysed player, postural status, ambient temperature, relative humidity, barometric pressure, heat index, local wind speed, local wind direction, local rain, oxygen uptake, vertical jumping height, horizontal jumping distance, direction the user is facing, ventilation, energy expenditure, R-R (HRV), body temperature, weather condition, which team is in possession, speed or spin of the game object, angle of a shot at a goal, defensive density, distance that the game object moves between players, whether the team is on attack or in defence, location of a reference player, whether the configuration is a set play (e.g. free kick, penalty kick, corner).

The measure of location or change in location involves a set of location values within a coordinate system which may be a measure of x axis, y axis and z axis coordinates set on a playing area or a change in x axis, y axis and z axis coordinates set on a playing area, or a measure of longitude and latitude or change in longitude and latitude, or any combination thereof.

Preferably the classification system comprises any one or more of a Soccer_classification, a Rugby Union or Rugby League classification, a Basketball classification, a Field or Ice Hockey classification, a American Football classification, a Lacrosse classification, a Handball classification, a Netball classification, a Baseball classification, a Water Polo classification, a Volleyball classification, and a Hurling classification.

Preferably the at least one parameter monitored during the game is obtained from an activity monitoring device or devices and the activity data is received from the monitoring device or devices. The device may be worn by the players or external to the players. Preferably the data is received in real time. Alternatively the data is received post activity.

Preferably the data is received as a data stream for each of the monitored parameter(s) or as an activity segment, and utilising a classification system comprises:
  trawling through at least one data stream and comparing data points in the stream against one or more pre-stored threshold criteria associated with the parameter with threshold tolerances relating to that stream, determining when corresponding data points of the data streams relating to the parameters associated with a particular activity satisfy the one or more threshold criteria defining the activity, and
  associating the activity or game event with the data points.

The data may be received and trawled automatically or alternatively the system is arranged to enable a user to manually time, distance or location stamp a block of activity data (e.g. by pushing a time, distance or location stamp or lap split button on a device or devices) and the stamped block for each monitored parameter is trawled and compared against one or more threshold criteria with threshold tolerances.

Preferably the method further comprises:
  providing player locations with classified and analysed data d or alerts to the user,
  Further to this the system may also
  compose a response based on the interpreted activity or the classified data points or both, and
  outputting the response to the user.

The response may be output in an auditory, graphical and/or text form and may be output to the user in real tune or post activity.

The response for example may be in the form of coaching advice which may alter how the user engages in a particular activity thereby optimising their exercise or activity. It may also alter an activity plan associated with the user.

The response may also be manually or automatically output.

Described herein is a system for analysing a sporting activity comprising a classification module arranged to receive relative player and game object location and possession data to classify activities, said data relating to multiple simultaneous location parameters monitored during the live or historical sporting activity and having:
  at least one memory component for storing one or more classifications for defining one or more activities, each activity being defined based on a set of threshold criteria with threshold tolerances for a combination of multiple location parameters within a coordinate system, and
  at least one processor arranged to utilise the classifications to process the received live or historical sporting activity data and identify one or more activities performed during the game.

Preferably the team sport classification module is arranged to receive the data in multiple data streams of consecutive location data points, each stream relating to one of said monitored parameters, and said processor is arranged to utilize the one or more classifications by:
  a) comparing corresponding data points of two or more data streams against the set of threshold criteria with threshold tolerances for one or more activities,
  b) identifying when the corresponding data points satisfy the threshold criteria for an activity and if satisfied classifying the corresponding data points under the activity, and
  c) repeating steps a) and b) for other data points from the data streams to identify the one or more situations or activities performed during the game.

Preferably the processor is further arranged to group consecutive data points classified under the same activity to define an instance of the activity within the live or historical sporting activity, the number of consecutive data points being indicative of duration of the instance of the activity.

Preferably the processor is arranged to process the activity data upon or after receiving the activity data for the entire historical game.

Alternatively the processor is arranged to process the activity data upon receiving activity data during the live game.

The data may be received in time, distance or location stamped blocks and the processor may be arranged to utilize the one or more classifications to process one or more of the time, distance or location stamped blocks of data and identify an activity performed during each of the one or more blocks.

Preferably the multiple relative location parameters monitored are any combination of two or more player locations, the game objects location, the location of the player or game object on the playing area and/or the possession of the game object.

Preferably the classification system monitors and analyses both teams.

Preferably measurements and classifications are made for both teams in both attacking events and in a defensive context.

Alternatively the classification system can be used to monitor and analyse a players defensive positioning in relation to the game object and other attacking and defensive players.

The measure of player relationships with each other may be a measure of the distance between players or the change in distance between players or the location of each player in relation to other players and the change in location between each player in relation to other players.

The measure of player and game object relationships with each other may be a measure of the distance between players and the game object or the change in distance between players and the game object or the location of each player in relation to the game object and the change in location between each player in relation to the game object.

The measure of possession may be a measure of the distance between player and the game object or a change in distance between the player an the game object or the location of each player in relation to the game object or the change in the location of the object with each player.

Preferably the classification is in relation to a first player or playing position. The classification is determined based on the geo spatial relationship between the first player and at least a second player, the first player and the ball, other players and the ball, the first placer and their location on the playing area and other players and their location on the playing area.

Preferably in some cases the classification is also related to a game event such as a goal, try, touchdown or basket where a score is initiated or where the game object such as a ball goes outside the boundaries of the playing area. The game event initiates the search for the possible location classification of the players and the game object just preceding or at the same time as the game event.

Other parameters that may be combined in a classification of a game event include physiological status, postural status, biomechanical status and environmental status such as heart rate, speed, power, stride rate, acceleration, stride length, direction a player is facing, height of a known location on the player from the ground, player impacts, time in possession, acceleration of the ball, number of touches (where the player was in possession of the game object), identification of the player that touched the game object immediately before or after the analysed player, postural status, ambient temperature, relative humidity, barometric pressure, heat index, local wind speed, local wind direction, local rain, oxygen uptake, vertical jumping height, horizontal jumping distance, direction the user is facing, ventilation, energy expenditure, R-R (HRV), body temperature, weather condition, which team is in possession, speed or spin of the game object, angle of a shot at a goal, defensive density, distance that the game object moves between players, whether the team is on attack or in defence, location of a reference player, whether the configuration is a set play (e.g. free kick, penalty kick, corner), The measure of location or change in location involves a set of location values within a coordinate system which may be a measure of x axis, y axis and a axis coordinates set on a playing area or a change in x axis, y axis and a axis coordinates set on a playing area, or a measure of longitude and latitude or change in longitude and latitude, or any combination thereof.

Preferably the at least one parameter monitored during the game is obtained from an activity monitoring device or devices and the activity data is received from the monitoring device or devices. The device may be worn by players or external to the players. Preferably the data is received in real time. Alternatively the data is received post activity.

Preferably the classification system comprises any one or more of a Soccer_classification, a Rugby Union or Rugby League classification, a Basketball classification, a Field or Ice Hockey classification, a American Football classification, a Lacrosse classification, a Handball classification, a Netball classification, a Baseball classification, a Water Polo classification, a Volleyball classification, and a Hurling classification.

Preferably the system further comprises one or more activity monitoring devices, each arranged to obtain data indicative of parameters monitored during an activity session.

The classification module may be remote from the one or more monitoring devices and each monitoring device is arranged to transmit the data including location data indicative of the monitored parameters to the classification module.

Preferably the classification module is remote from the one or more monitoring devices and each monitoring device is arranged to transmit the data including location data indicative of the monitored parameters to the classification module.

Preferably the measurement system determines location of the players on the field independent of the players transmitting location information.

Preferably the system further comprises:
a central station for accommodating the classification module, and
a receiver for receiving data indicative of multiple parameters monitored during an activity session from the one or more monitoring devices.

Alternatively the classification module s housed within each monitor device.

Preferably the system further comprises an interpretation module having a processor for processing data classified under an activity to determine a level of compliance with a predetermined training or practice plan.

Preferably the system further comprises a plan generation module having a processor for updating training or practice plan based on the level of compliance determined by the interpretation module.

Preferably every player's location on the field is measured simultaneously.

Preferably this measurement includes both teams.

Described herein is a classification system for analysing live and historical sports activity data relating to multiple location parameters monitored during a game to determine one or more activities performed during the activity session, the classification system comprising:
  at least one memory component for storing one or more classifications for defining one or more activities, each activity or situation being defined based on a set of threshold criteria with threshold tolerances for a combination of location parameters, and
  at least one processor arranged to utilise the classifications to process the sports activity data and identify one or more activities performed during the game.

Preferably the team sport classification system is arranged to receive the data in multiple data streams of consecutive data points, each stream relating to one of said monitored location data parameters, and said processor is arranged to utilize the one or more classifications by:
  a) comparing corresponding data points of two or more data streams against the set of threshold criteria with threshold tolerances for one or more activities, b) identifying when the corresponding data points satisfy the threshold criteria for an activity and if satisfied classifying the corresponding data points under the activity, and c) repeating steps a) and b) for other data points from the data streams to identify the one or more situations or activities performed during the game.

Preferably the classification count per game and per season and the metrics within each classification can be used in computer simulations to assess player ability versus benchmarks and versus other matched players.

Preferably the classification count per game and per season and the metrics within each classification can be used to characterise players in gaming simulations where a recorded players classified abilities are simulated in a computer game.

In this specification, activity and activity type means a particular type of action performed within the sporting, activity on the field, court or playing area by a player or players. This action may or may not be associated with the game object. Examples of activity in Soccer are Finishing (taking a shot at goal), assists (where the player passes the ball that puts the scorer in a position to score), and tackles. These activities or activity types segment game data into a continuous series of identified activity segments based on location threshold criteria that define a particular activity.

The term game object means any object that is used during a team game where each team tries to win possession of the game object. The game object is usually a ball or puck.

The term playing area refers to a playing field, court, diamond or rink. The playing area in the area within which the game is restrained to and going out of the playing area is termed as 'out'.

The term game event refers to a specific situation that occurs within a team game where a particular geo spatial relationship between the player and hail, the player and other players, the ball and players, the ball and the scoring area and the ball and the boundaries of the playing area occur.

The term skill refers to any instance that involves a classified game event. Examples of this include scoring, passing the game object and moving other players away from the ball or scoring area.

The term reference first player refers to the target player or playing position to which the classification is applied to.

The term second player refers to any other player on the field other than the first player. This can include opposition players.

The term location data refers to data obtained from any method that determines location with the key measures in this case being camera system data, triangulation data and other forms of personal location data like GPS. Location data can include absolute or relative locations or distances between players, the game object and/or locations on or off the playing area.

Relative location refers to comparative locations between players, the game object and/or locations on or off the playing area. Reference relative locations are pre-set expected locations that the classifications uses to search to detect activities during a game or practice.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION

1. Virtual Coach System Overview

Figure 1:
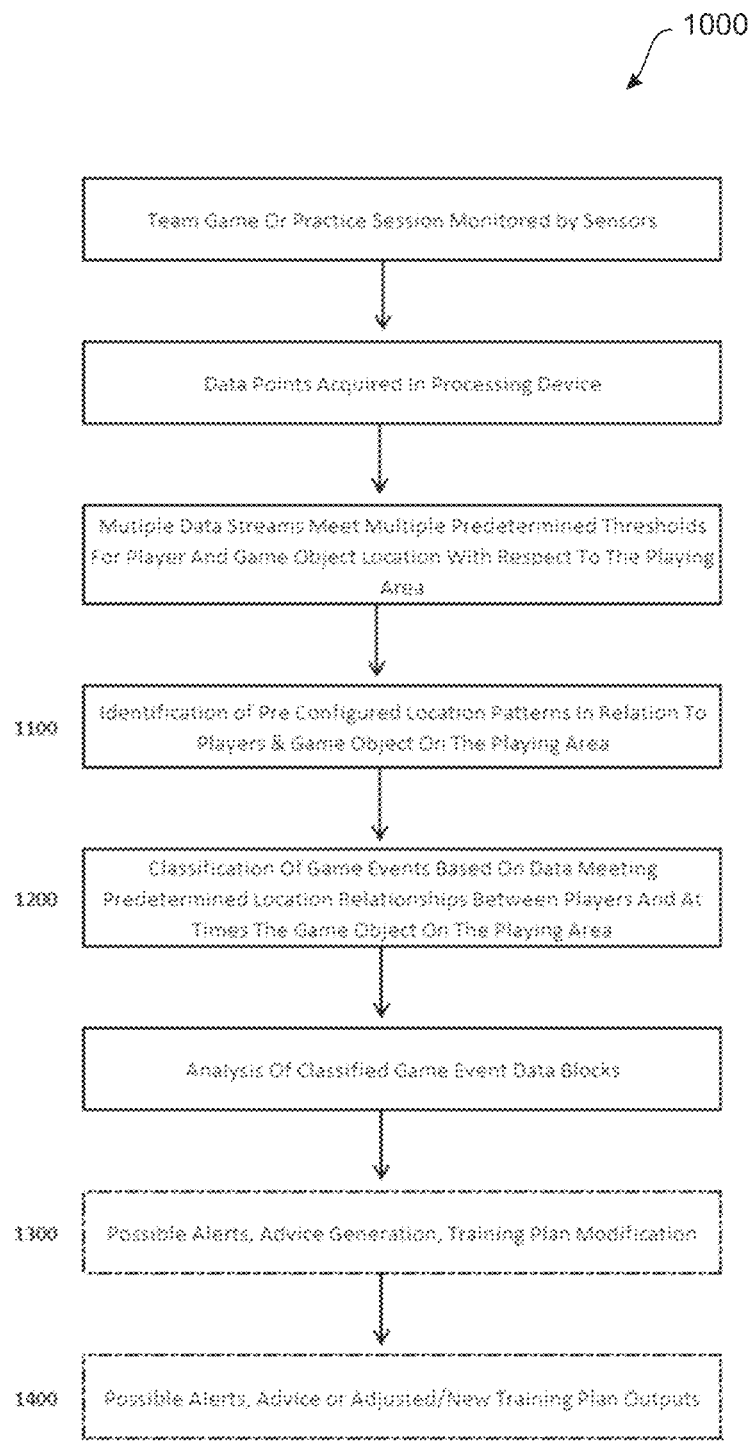
FIG. 1 shows steps within the team sports classification system.

Referring to FIG. 1, an overview of a preferred method or a system flow diagram 1000 for analysing field team sports is shown. A user of the system engaging in field team sports such as Soccer, Rugby Union and League, Basketball, Field and Ice Hockey, American Football, Lacrosse, Water Polo, Hurling, Volleyball, Baseball and Handball, either prior to or whilst the system is being used. The system gathers information and data related to the activity or activities performed during the session or game, preferably using at least one exercise-or activity monitoring device worn by a player or using location camera or triangulation system. The information is received by the system either manually via the user initiating uploading of the information from the monitoring device or devices or automatically via the monitoring device or devices, or from some other source for analysis, and is received and/or analysed either during activity or post activity. The system may be part of the monitoring device or may be separate, running on a personal computer for example, or a remote server accessible by and in communication with a personal computer and/or one or more monitoring devices.

During analysis the system will identify at step 1100 the different types of activities the user has engaged in or is engaging in during the session or game. A classification system, which will be described in more detail below, is to identify the activities performed by the user from the activity information data received. The classification system enables the overall system to partition the data into one or more data streams or blocks relating to the one or more activities performed by the user during the session or game. The data can then be processed at step 1200 while taking the type of activity performed into consideration. The classification system defines an activity based on at least one satisfied threshold criteria with threshold tolerances from at least one monitored parameter (other than distance travelled or time or both which define the length of the activity or activity session but not the type of activity). In most embodiments, the classification system defines an activity using location zones where one or more threshold criteria are used that may occur within an activity session. This for example may be that during game, scoring an easy goal referred to as 'Finishing a Sitter' would require the following parameter criteria to be met. The scoring player scores a goal where they are behind the opposition defensive players or on the 'wrong side' of their defence meaning the goal scoring player is closer to the goal than all the opposition defensive players except their goal keeper. The goal keeper is the only person on the field in front of the scoring player and no player is 3 meters of the scoring player when the shot at goal is taken.

The parameters include the 'event' which in this case is a goal which is not necessary for all classifications. The next parameter is the relationship on the field of the first player and at least a second player where the goal scorer is closer to the goal than all the opposing players except the goal keeper. No defensive player is within 3 meters of the goal scorer when he took the goal scoring shot.

In accordance with the invention classified activities are identified using one or more data streams first (each stream being associated with one of the parameter(s) used to define a particular classified activity for example), then the data for the game or session activity is processed specific to the defined activity as opposed to differently classified or non-classified game or session activities that have slightly different definitions. The effect each type of activity or exercise has on the user's overall fitness, performance or fatigue is different and therefore it is necessary to distinguish between them to provide satisfactory analysis and appropriate feedback and advice. In some embodiments the data once classified is processed (1200) for the various identified activity types to translate collective activity data into a tutorial or advice (step 1300) for example. The data may be processed with or without the rest of the activity session data. The data relating to a particular activity may be processed against a plan, historic data, or an ideal zone with threshold tolerances which includes reference relative locations and desired relative locations. In some embodiments a response is generated from the output of the processing stage which may be advice provided in the form of a prescription (method for modifying a plan) or a solution (method for modifying how a user engages in an activity) for example. The advice may be output (step 1400) in either a text, auditory or graphical form as opposed to a visual or auditory display of raw or derived exercise data in real time or post activity.

Advice is a preferable feature of the invention and may alternatively not be supplied by the system but from a trainer or some other source for example.

In one embodiment the data is automatically received by the classification system in one or more streams and then trawled, with the data points being compared against one or more threshold criteria associated with the parameter relating to that stream.

In an alternative embodiment the system may be arranged to enable a user to manually time, distance or location stamp a block of activity data by pushing a time stamp or lap split button on a device and the stamped block for each monitored parameter is then trawled and compared against the one or more threshold criteria.

For both embodiments corresponding data points of the one or more streams or blocks that relate to one or more parameters associated with a particular activity are associated with a particular activity when the system recognizes that the data points satisfy the one or more threshold criteria with threshold tolerances defining that activity, and therefore associates the corresponding data points with the activity.

2. Applications for Team Classification

The system applies to team sporting activities where the aim is to score points with a game object like a ball, played on a field, rink or court or in a 'playing area'.

Some of the possible applications of the technology are:
1. Soccer,
2. Rugby Union,
3. Rugby League,
4. Basketball,
5. Field Hockey,
6. Ice Hockey,
7. American Football,
8. Lacrosse,
9. Handball,
10. Volleyball,
11. Netball,
12. Hurling,
13. Baseball
14. Water Polo This list does not exclude the application of the invention on other team sports that use a field, court or playing area to play their game.

It is preferable that the system caters for more parameters as this would enhance the flexibility of the system not just with accuracy and the ability to define more activities but also in terms of compatibility with a vast range of monitoring devices.

3. Types of Classification

The point of this classification system is to look at team and player performance within a live or historical sporting activity at a far more detailed level than the previous stare of the art. While previous systems can be used to define assists, passes and goals for example they are unable to automatically characterise the quality of the assist, pass or goal. There are a number of different levels that may be analysed to correctly quantify game and training session data. They are:

a) Physical and Physiological Activity

Physical ability does not measure any technical or tactical qualities of players. Examples of factors that might be measured for soccer are; length of sprints, number of sprints, number of sprints over defined distances, recovery between defined distance sprints, variation in sprint effort over a defined distance sprint, sprint endurance, acceleration endurance, peak effort endurance, Anaerobic Threshold, maximum power for different defined distance sprints, average power for defined distance sprints, maximum or average acceleration for defined distance sprints.

b) Player Technical Quality

Player Technical quality measures the key technical attributes of a player. These might be for a striker in soccer; Finishing or scoring goals which could be broken down into Finishing a 'Sitter' or easy goal, Finishing a Long 'Sitter', or Finishing a 'tricky' goal. Assists can also be measured which may include low quality and high quality assists. Anticipation can be measured as can Vision in a build up to a shot at goal. Movement off the ball and Composure may also be measured. Other measures can be the player's ability to be 'in Position', Tackle Success and Penalties and Free Kicks Awarded. Each area defines a key attribute for a striker in soccer, a player that scores highly in all these areas can be determined to be very effective for their position in the game.

c) Tactical Ability

Team Formation and Coverage can be measured. Team Formation measures how the players behave as a coordinated unit during the different situations in a game and Coverage measures whether there are 'gaps' in play or opportunities for players to move through the cover defense and how closely marked opposition players are on defense and how 'open' players are on attack. The term 'closely marked' means how close a player is to their opposing player or player they need to mark. Open meaning that they have distance between themselves and their opposing player allowing enough space to receive the ball.

4. Key Classification Parameters

The key parameters for multi parameter classification are:
a) Player Location (first player and at least a second player) in relation to the Location of the Game Object
b) And first Player Location in relation to Location of Other Players (at least a second player)
c) Placer Location (first player and at least a second player) in relation to the playing area
d) Player location (first player and at least a second player) in relation to the scoring area
e) Game Events like goals, passes, assists and tackles These parameters must be measured to analyse a player's activity during a game. This does not exclude the use of other locations in the multi parameter classification.

Secondary assisting parameters which are also used are:
f) Which team is in possession Tertiary parameters that may also be used are:
g) Speed or spin of the ball
h) Distance that the ball moves between players
i) Elapsed time
h) Distance covered by the player Finally, other parameters may be attached to classifications which include:
k) Heart Rate
l) Speed
m) Power
n) Stride Rate
o) Acceleration
p) Stride length
q) Direction a player is facing
r) Height of a known location on the player from the ground
s) Player Impacts
t) Acceleration of the ball
u) Number of Touches (where the player was in possession of the ball)
v) Identification of the player that touched the ball immediately before or after the analyzed player Preferably the classification is applied to every player on the field, court or playing area simultaneously meaning each player is analysed from the point of vie of being the reference first player.

Preferably the classification occurs for both teams on the field, court or playing area simultaneously.

Preferably the data is classified and analysed n real me although data can be analysed post game.

5. Sensor Array and Data Processing

The system is made up of 2 parts; a sensor system and a processing system. The sensor system can use;

A device or devices that record data which can then be loaded into the processing system to be processed post game or real time or a device or devices that transmit data in real time to a base station unit for processing.

The device that obtains location data and other physiological, postural, biochemical and environmental data may be worn by players or may be external to the player and/or playing area. This can be in the form of video motion capture and triangulation, telemetric triangulation or devices worn by players that contain GPS and other systems that can determine location of players and the ball.

The processing unit is either software or Fin ware housed in a device that contains a data receiver, with processing ability to analyse, interpret and present acquired data in real time or post game.

Preferred Embodiment(s)

The system and method of the invention may be implemented using the following classification systems both of which involve the geo spatial relationship between players and the game object and in relation to locations on the playing area. There are two applications of this system; classification of tactical ability and classification of player technical quality and or skill. This implementation should not be considered as limiting the scope of the invention but rather a preferred embodiment of the underlying classification concept defined above.

DETAILED DESCRIPTION

6.1 Classification of Tactical Ability

Many team sports that involve a game object like a ball are usually about ability to create space when in possession and on offense and close down space when in defence. A 4-4-2 formation in Soccer requires that the players maintain a defensive 'shape' in relation to one another depending on the whether they are attacking or on defence. The shape for example in the hail backs cases are a series of desired relative locations on the field that they must stand in relation to the location of the ball and each other with threshold tolerances. Their ability to maintain 'shape' and not get caught 'out of position' is crucial to the success of the team in the game.

There are 3 layers to tactical play:
1. Player location in relation to the location of the ball (which can also be called 'shape').
2. Player location in relation to opposition players 'off the ball' (players may lark an opposition player closely effecting 'shape')
3. Player location in relation to opposition players 'on the ball' (a player may be 'on the ball' either on offense or defense which effects 'shape')
4. Placer location in relation to players of the same team.

6.2 Settings for the Classification System

The core of the team sports classification system is the settings to the system which specify thresholds for desired locations and distances between players and the ball. This requires multiple parameters and it is the thresholds for these parameters that combine to define a game situation for a player or a group of players.

This is primarily defined by; player location in relation to the location of the game object or ball and player location in relation to location of other players and at times in relation to a game event.

Secondary assisting parameters which are also used are location on the field, court or playing area and which team is in possession.

Other parameters used include effort parameters like, heart rate, speed and power, and also other variables like physiological status, postural status, biomechanical status and environmental status. This can include stride rate, acceleration, stride length, direction a player is facing, height of a known location of the player from the ground, speed of the ball, spin on the ball, acceleration of the ball, number of touches (where the player was in possession of the ball), identification of the player that touched the ball immediately before or after the analysed player.

The method for setting a player location is as follows:

a) Player Location Within a Coordinate System in Relation o the Ball

Figure 2:
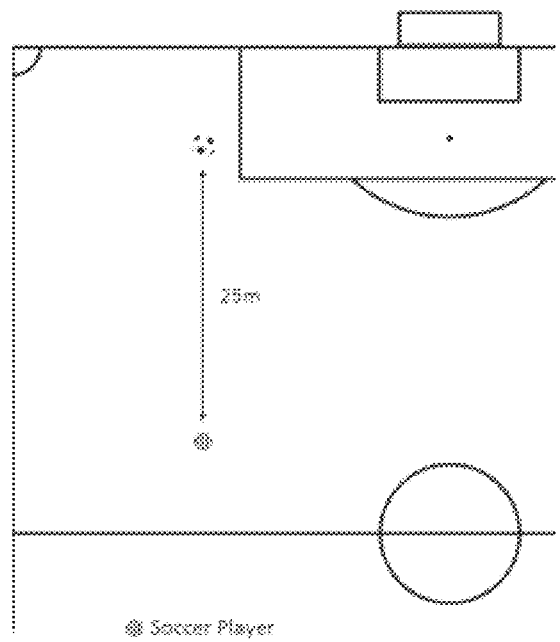
FIG. 2 shows how a reference first player's desired location is determined in relation to the ball.
Figure 2:
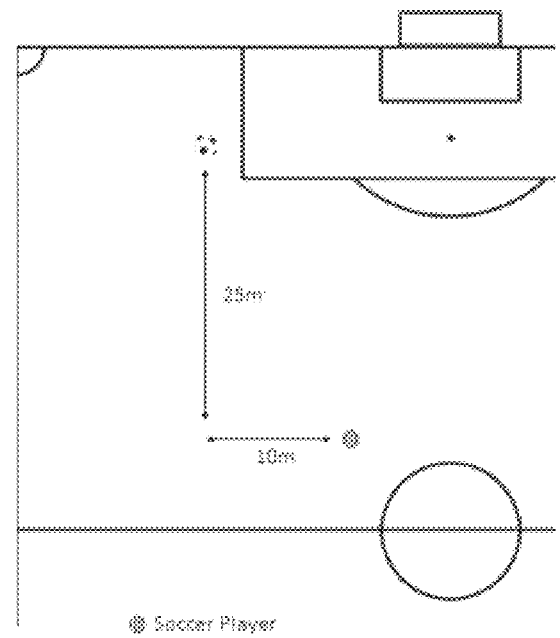

A player's location can be defined in relation to the ball for a coach or trainer in setting the analysis settings. This can be taken as a 'latitude' and 'longitude' or x and y axes coordinates. For example a player might need to be 25 meters away from the ball in the attacking third of the field in defence. (Longitude). They may also be required to be directly in front of the ball or offset from the lateral location of the ball by a number of meters or an angle. (Latitude) (See FIG. 2) A vertical axis could also be used to determine jumping and ball height.

b) Setting a First Player's Location (Reference Players)

Figure 3:
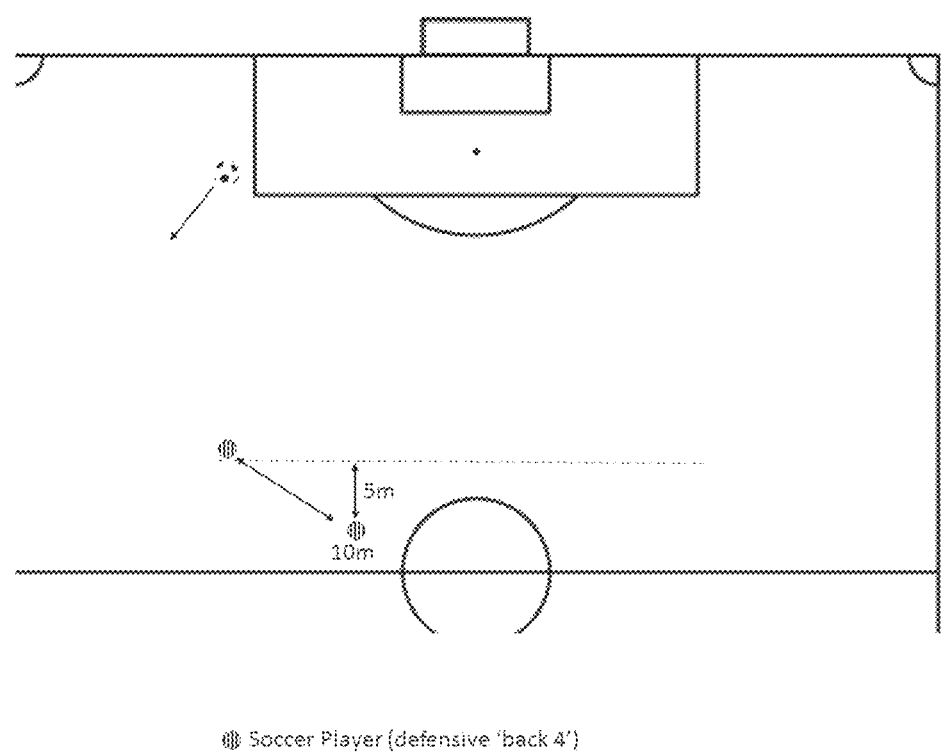
FIG. 3 shows how a second player's desired location is determined in relation to the reference first player.
Figure 4:
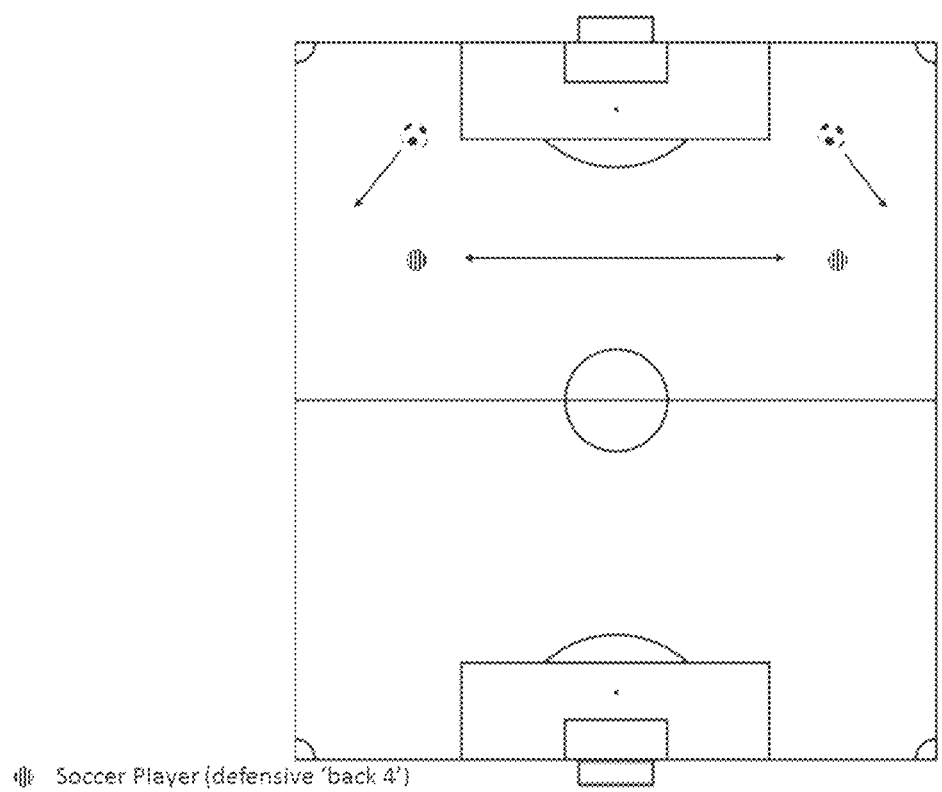
FIG. 4 shows how the reference first player's desired location is determined by the location of the ball and its direction of movement, and how the first player's location can switch dependent on which side of the field laterally that the ball is on, FIG. 5 shows that a flexible player desired location zone with threshold tolerances occurs around the player to accommodate slight discrepancies the location of the player.

A player's position can also be defined by the location of another player. The player is 10 meters to the left of the first player or 'reference player' and 5 meters behind them dependent on the location of the ball. (See FIG. 3)

Figure 6:
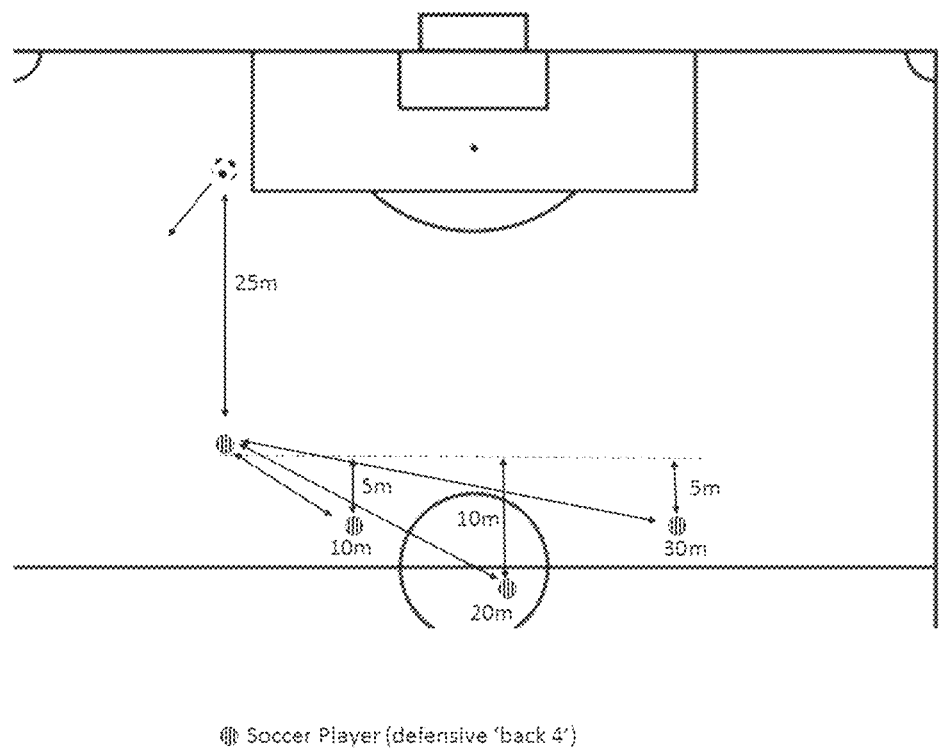
FIG. 6 shows how the 'shape' or formation of the players desired location is set with regard to a defensive 'back 4' in soccer desired location in relation to the FIG. 7 shows how the defensive 'shape' changes dependent on which side of the field laterally that the ball is on, FIG. 8 shows the other defensive extreme of the fullbacks when they are pinned against the penalty area. This shows how the desired defensive formation becomes flatter the further back the formation is pushed.

Often a 'player units' position is dependent on a reference first player where all the other players 'zones' within the player unit are defined by the first player. (See FIG. 6)

c) Ball Location on the Field Effects Reference First Player Designation

Figure 7:
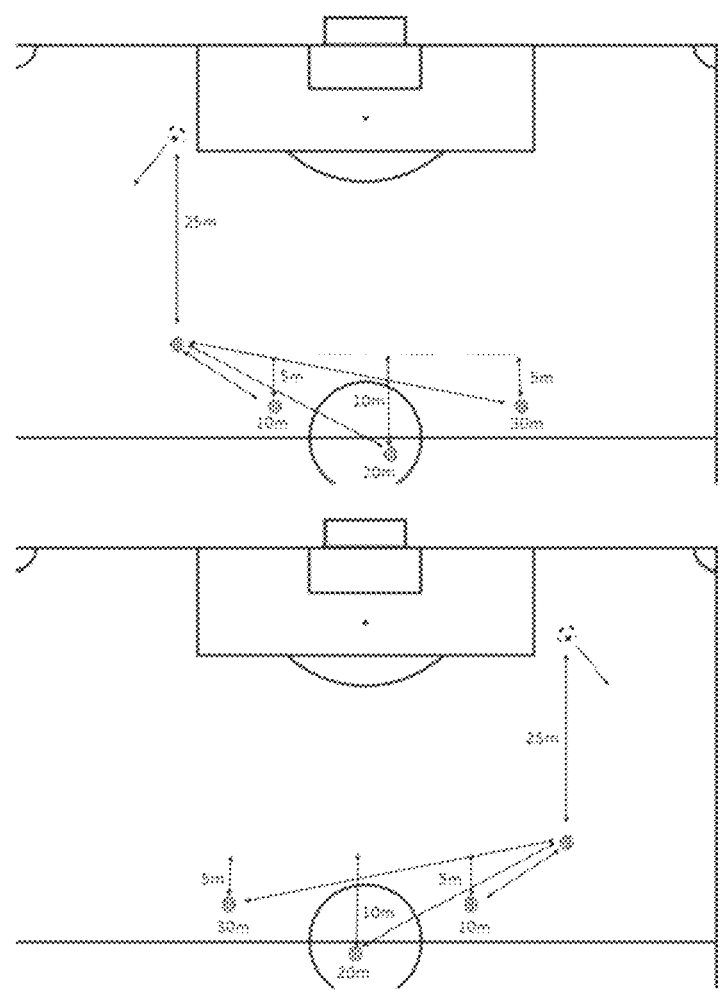

The reference first player can change. For example using the full backs in a 4-4-2 formation for soccer. If the ball comes down the left flank (from the perspective of the fullbacks) the left fullback moves forward and becomes the first player and all the other fullbacks are positioned in relation to them. If the ball comes down the right flank, the right full back moves forward and the other fallbacks line up positioned in relation to the right full back. Distances from other players and the ball are still the same, they just swap. (See FIG. 7)

d) Flexible Location Zones

Figure 5:
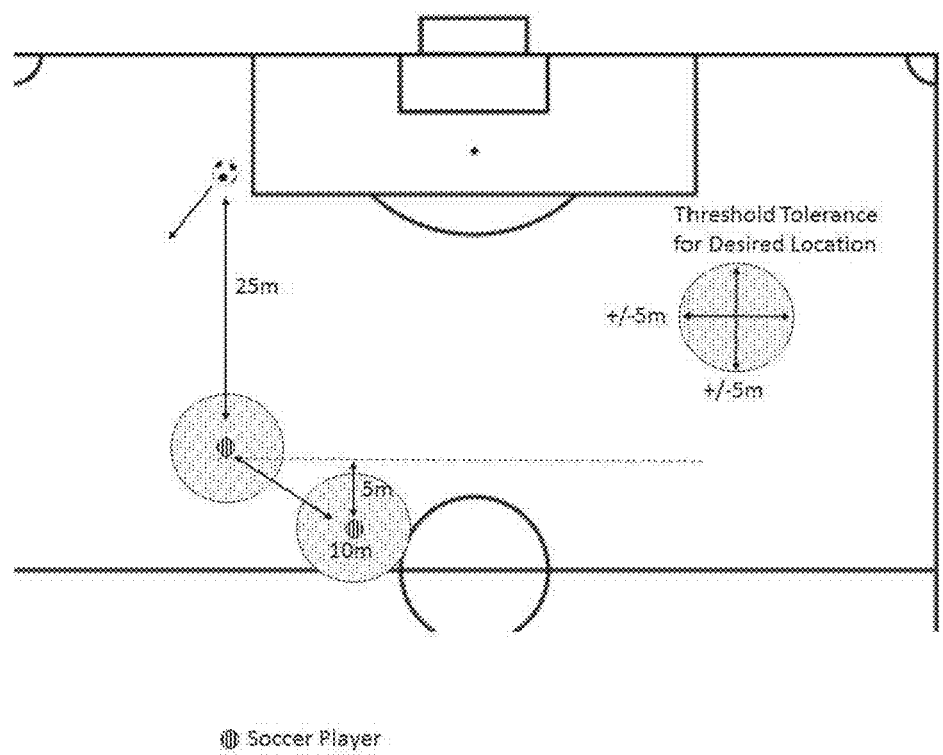

The system described allows a coach to define the formation or tactical shape of different groups of players and individuals. This means in the settings the coach or trainer defines the location of his/her players on a field dependent on the location of the ball or other reference first players. Because there needs to be some level of freedom to player's compliance to the defined locations in relation to the ball and each other, a location zone is created with threshold tolerances. This location is a zone with a lateral and fore/aft flexibility in meters defining approximately where a player should be. (See FIG. 5) Not only can the location be defined but so also can the degree of flexibility around this location between defined both horizontally across the field and longitudinally on the field as a set of location values within a coordinate system. The horizontal zone thresholds might be 5 meters either side of the set location that the player should occupy and 5 meters fore and aft of the same location.

e) Sliding Continuum—Setting Both Forward and Back Positions of the Players As a team is pushed back to their end of the field in defence, there is a tendency to compact together so the distances between players reduces and 'shape' tends to 'flatten' where the players become more laterally lined up across the field. To take this into account the coach defines the desired relative locations for both ends of the field and this then forms a continuum. A player may need to be 25 meters away from the ball when defending in his/her teams attacking third but only 10 meters or less away when on the edge of the penalty box. The system then calculates the distance away from the ball for every situation in between.

Figure 8:
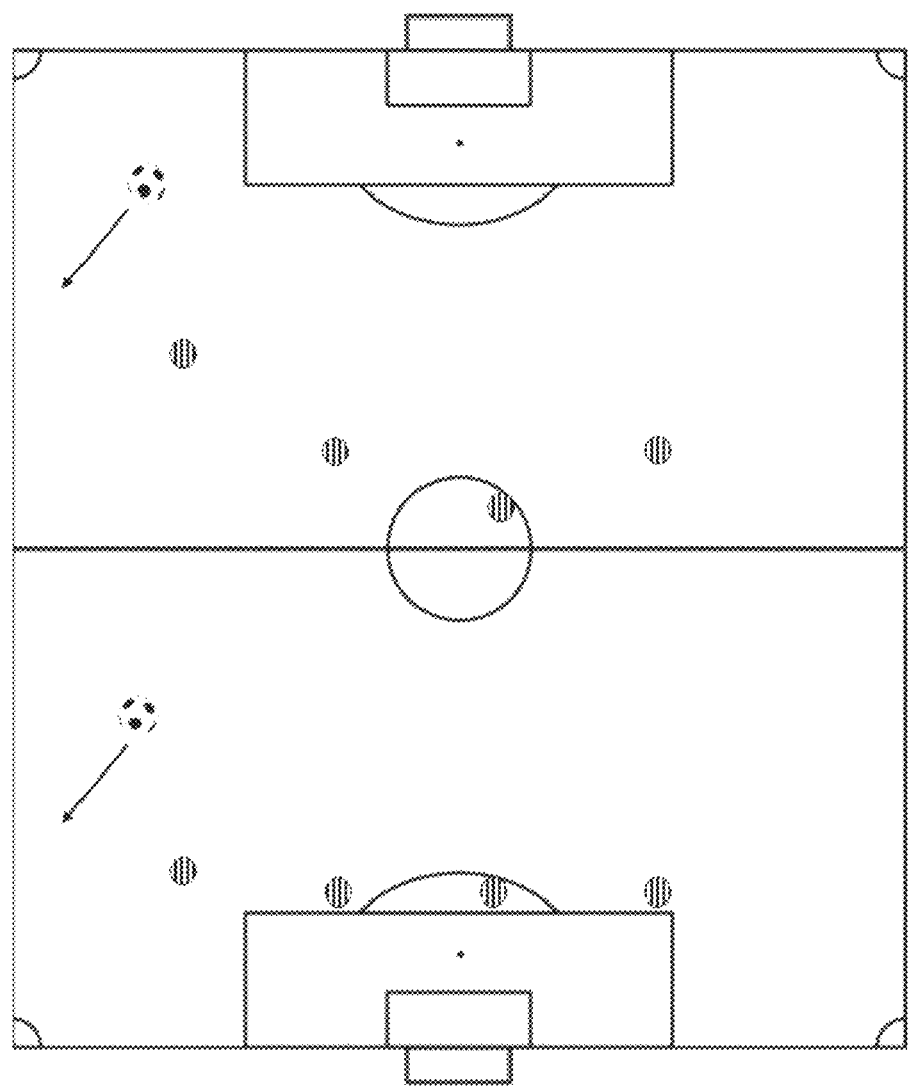
Figure 9:
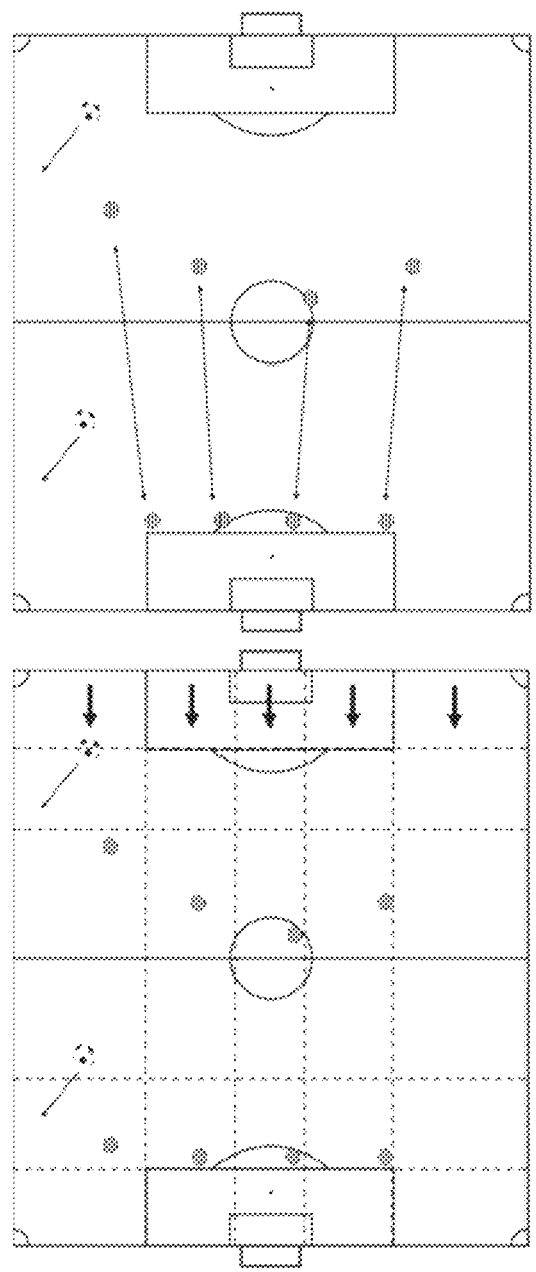
FIG. 9 shows how each player should remain predominantly in a longitudinal strip of the field.
Figure 10:
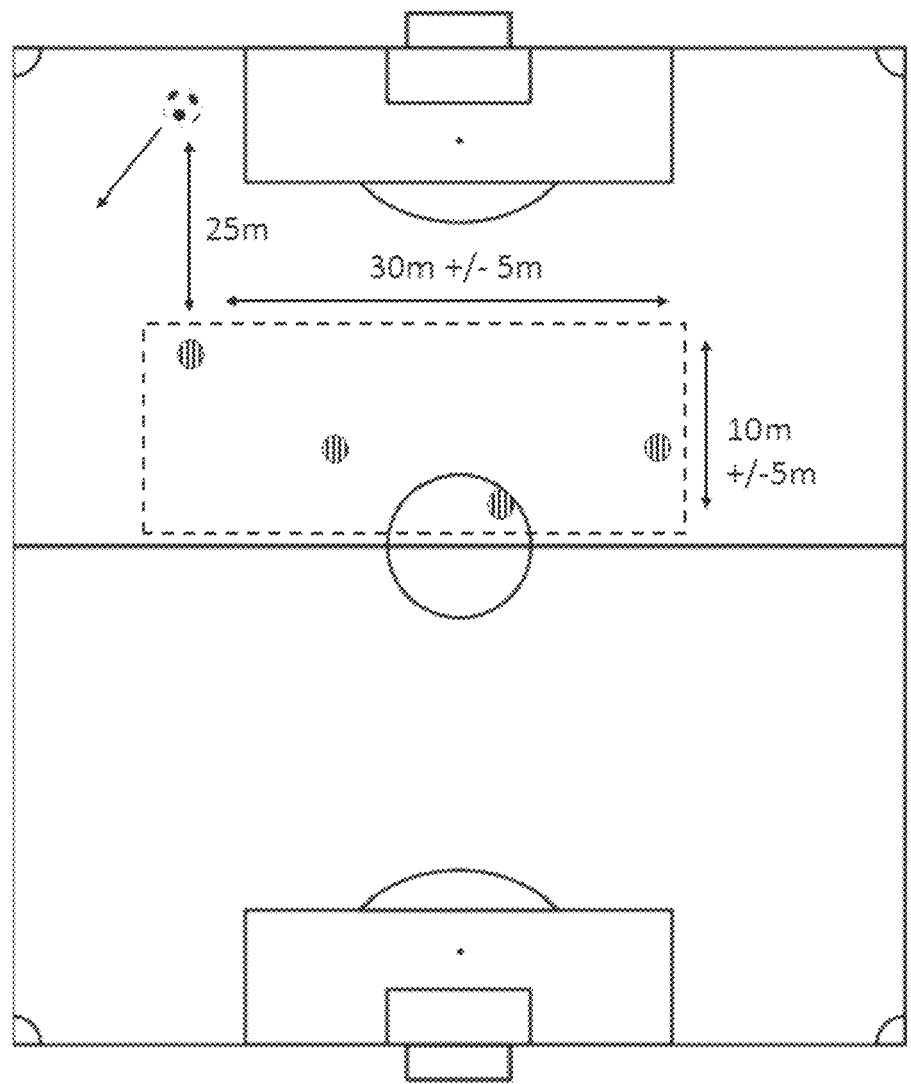
FIG. 10 shows an alternative method to the afore mentioned method where the defensive players are assessed as being in a desired location if they conform to an overall zone which they all fit into.

This also applies to the distance a player is away from the reference first player. (see FIGS. 8 & 9)

f) Settings for Offense and Defense

The system needs to know if the measured team is on offence or defence.

Offense is measured by the last player touch. The 'last touch' means that if a member of the team measured is closer than 1 meter to the ball currently or has been in the last 3 secs then the measured team is in offense. The ball must also change direction of movement. If no member of the team is closer than 1 meter to the ball and has not been so for 3 secs then the team is in defence.

g) Set Play

In a set play scenario, a coach can place players desired relative positions within a coordinate system for the start of the set play. (e.g. a corner)

Summary of Classification Settings

The coach programs into a multi player location measurement software system, the preferred desired relative location of a player based on the following criteria:
1. Location of the ball
2. Whether the team is on attack or in defense
3. Location of a reference player or first player
4. Rules about who the first reference player is depending on where the ball is located
5. Whether the configuration is a set play (e.g. free kick, penalty kick, corner)
6. Planned situations where players fill a vacant position for a player out of position
7. Players can be linked into 'units' that work together (e.g. full backs)

Classification

Once the data has been input the automated classification system can be utilised based on reference relative locations. We now know where each player should be in relation to the ball both on attack and defence and each location is defined by desired relative locations that-have the exact position required for the player with of location of ±5 meters both laterally and fore/aft for example.

The system then monitors data streams and looks for 'matches' in either individual player positions or in positions of player units.

Individual Players

Ideally if the predictive positional criteria has been input correctly and player is playing 'in position', there should be a 'match'. Each instance of a 'match' is identified and labelled (e.g. midfield/defence) with the data logged at the time of the identification, 1 min historically, 10 mins historically, and whole game allowing for deeper analysis of a situation. If the player is 'in position' consistently then there should be a continuous stream of 'matched' classifications.

Player Units

Player units can also be classified as a group where a 'match' can be defined as 'most' of the players conforming to the classification. 'Most' can be defined by the coach where it may mean that so long as 75% of the players create a 'match', a classification occurs and the player out of position is identified. For example in a 4-4-2 formation which means 4 full backs play as a unit in a soccer team, 75% of 4 is 3 so if 3 players are in position, a classification occurs and the player out of position is identified with the data logged at the time of the identification, 1 min historically, 10 mins historically, and whole game allowing for deeper analysis of a situation.

Example of How a Coach Might Set Player Position

Soccer Full Backs (4-4-2 Formation) on Defence

We will now go through an example of a coach placing players in their correct location subject to the balls position and the position of the reference players.
1. The ball is placed on the representation of the playing area in the top left quadrant.
   Different forms of classification can be set by defining the location of the ball on the field within a coordinate system. The location might be the attacking third of the field, within the 18 yard penalty area or the 6 yard box. Each situation demands a different set of settings for player's locations to be applied.
2. The positioning of for example the back 4 in soccer 'off the ball' in defense is related to the balls location on the field. We would know that the team is in defense because no player of the team is within a meter of the ball and hasn't been this close for more than 3 seconds meaning their team is not in possession of the ball. The coach selects a 'shape' or formation for his defensive player unit when the team is on defense in a 4-4-2 formation. The coach selects the reference first player which in this case is the left full back and places them on the representation of the field in the correct location in relation to the ball.
3. All locations of the 'player unit' (fullbacks) are determined in relation to a 'reference first player'. Although each player's location could be determined off the previous players location in the sequence of locating each player. (i.e. the established location of each player makes them the reference first player for the establishment of location of each following player in the sequence of determining all player locations.) The 'reference first player' varies dependent on the balls position if the ball moves left (in relation to the defense) the left dank player becomes the 'reference first player'. If the ball were to move to the right, the right flank player would become the 'reference first player'. The software covers this when the ball is positioned in the top right quadrant for the coaches allocation of player locations. (see FIG. 7)
4. The coach places the reference first player 25 m away and directly in line with the ball (the ball is in front of them). This is achieved by either placing the player locations directly onto a representation of a playing area on a computer or similar or by setting all the distances (lateral and fore/aft distances from the ball or reference first player). A locational flexibility with a threshold tolerance of 25 m±5 m further away or closer to the ball and ±5 meters in terms of lateral location in relation to the ball is added by the coach.
   This means that if the opposition moves the ball left from the perspective of the defending players and forward (towards the defence), the closest dank player (left full back in this case) will move right to be directly in front of the ball and move back so that they are 25 meters in front of the ball.

Should the opposition move the ball left from the perspective of the defending players and pass it back towards their goal keeper, the closest flank player (left full back in this case) to the ball moves left and forward to maintain the 25 meter distance.

5. The coach or computer places the next player's relative location onto the representation of the field. This might be the nearest player in the 'back 4' to the 'reference first player' They are placed in a reference relative location that is determined by the computer or manually by the coach to be 10 meters away and 5 meters behind the reference first player. A 5 meter flexibility zone with threshold tolerances is set by the coach laterally and longitudinally. (see FIG. 5)

6. The coach or computer system then places the next player onto the representation of the playing area or the coach keys in the distances. This is the next nearest gall back to the reference first player whose desired relative location is determined to be 20 meters away and 10 m back from the reference first player. A flexibility zone with a threshold tolerance of 5 m front and back and left to right occurs. (see FIG. 6)

7. The final player's relative location is also set by the coach or computer which in this case is 30 meters away from the reference first player and forward 5 meters with the same flexibility zone of location as the others. (see FIG. 6)

8. The positions are now established for the other defensive extreme which occurs at the other end of the field when the full backs are more compacted defensively in terms of distance apart. This occurs in the game when the back 4 are pushed back by their opposition until they are pushed up against the edge of the penalty area where they cease to move back causing a flattening of their 'shape'.

Once the system has the reference relative locations for both ends of the field it is able to calculate all desired relative locations in between. There is also a slight compaction of the player unit as they retreat back to the where the width between players is 6-8 meters once they are on the penalty box line where all of the back four are now within the width of the penalty box.

This subtle measurement change continuum from 10 meters apart to 6-8 meters apart can be set in the classification calculations by the coach.

For example if a player is 10 meters back from the reference first player at half way on the field (45 m from the goal line and 29 meters from the edge of the penalty area) and 0 meters when pushed back to the edge of the penalty box (16 meters from the goal line) this means there is a fore/aft compaction of 0.34 meters per longitudinal meter back towards the penalty box. If the lateral compaction went from 12 meters at the half way line and 8 meters of the edge of the penalty area then the rate of compaction is 0.14 meters per longitudinal meter of retreat. Therefore 14 meters from the penalty box the fore/aft distance in relation to the reference player is 4.8 meters (14×0.34=4.8 which is added to the minimum distance of 0 which is 48 meters). The lateral distance is 10 meters. (14×0.14=2 which is added to the minimum lateral distance of 8 m to establish a 10 m lateral separation.) The same calculations can be conducted for the reference player's distance from the ball.

The relative locations are now calculated for each longitudinal 'strip' set by the coach. (see FIG. 9) Calculations can combine multiple locations to further ascertain exact location.

9. The only times in defense that these dimensions cease to exist or change is within 18 yards of their own goal where set play scenarios are programmed in. This means that all classifications occur between both of the penalty boxes of both teams.

The full backs 'player unit' is therefore measured as a unit where each team member's position is determined in relation to the ball and the unit moves as if connected by a 'rope' attached to each player.

A simpler method of a 'zone' with which the defensive unit fits into is also possible using similar calculations of distance from the ball and position in relation to the balls location.

Soccer 'Back 4' (4-4-2 formation) Offence

To ascertain whether the measured team is in possession and on offence, a member of the team must be located less than 1 meter from the ball. Possession can also be determined by a change in trajectory of the ball upon falling within a meter of the contact player or by a change in speed of the ball for the same scenario. If gyroscopes are used, it can be determined that the player is facing the ball.

In offence there is more of an attempt to create space so the back 4 will tend to spread out so instead of being 10 meters apart they are now 15 meters apart.

In terms of determining the location of the back 4 player unit in relation to the ball, the closest flank player must be within 25 meters directly behind the ball with but with a higher fore/aft flexibility threshold tolerance of ±10 meters and ±5 meters in terms of lateral location in relation to the ball.

The 'reference first player' from which the defence moves in relation to, operates as already outlined for defence description. Each player is again set in relation to the reference first player, in this case the full back nearest the reference first player is set at 15 meters away laterally and approximately 5 meters behind them with 5 in of threshold tolerance flexibility both laterally and The next nearest fullback is set 30 meters laterally away and 5 meters back with a 5 meter front and back and left to right threshold tolerance flexibility. The final player is also set 45 meters away from the reference first player and forward 5 m with the same flexibility of relative location as the others.

The aim is for a system that can measure location of the ball plus the relative location of members of a team and can classify where members of the team should be and measure whether players are in relation to these desired relative locations within zones with both lateral and longitudinal threshold tolerances in relation to the field.

This means that based on the location of the ball the system 'predicts' where the players should be as a classification and measures how closely the players conform to this. The 2 possible outcomes are that there is a match between actual player location and the desired relative locations or one or more players is measured 'out of position'. The classification system therefore detects the 'shape' of a player unit and classifies whether players are 'in position' or 'out of position'.

Along with each classification, data relevant to the classified situation is recorded which includes effort parameters such as current heart rate, speed and stride rate which are recorded with historic data. The historic data includes data in the last minute of activity and complete data for the entire game and part of a game up until the point classified.

Data can be seen by the coach 'on screen' in real time during practice or a game along with locations of players or the system can be used for post-game data processing.

6.3 Further Uses a) Tactical 'Snapshots'

This data would assist in providing deeper insights into player instruction, tactics, coaching and substitution. Data obtained is logged historically (e.g. 1 min into the past, 3 min into the past, 20 min into the past, one half, the whole game) along with current data taken at the time of the 'snapshot'.

A coach can also manually take a 'snapshot' of a mistake during the game, labelling the situation and the system will automatically collect all the data on the situation and historic data as already described.

b) Monitoring Opposition Tactics Using Ball Routes

Similar classification tactical analysis can occur of the opposition depending on the balls location when in defence. In situations where the opposing players cannot be monitored but the balls location and movement is still known, the ball may be continuously moved down the left flank of the field and then moved into the midfield and moved wide again in the attacking third of the field. Repetitive routes taken by the ball down field may be an indication of the opposition team's tactics.

6.4 Ease of Set Up

Set Up involves programming in the reference relative locations and threshold tolerance criteria for each player and ball or can be as simple as locating all the players and ball on a representation of the 'field' on a computer screen or similar and the software calculates all the values required to define location.

Figure 18:
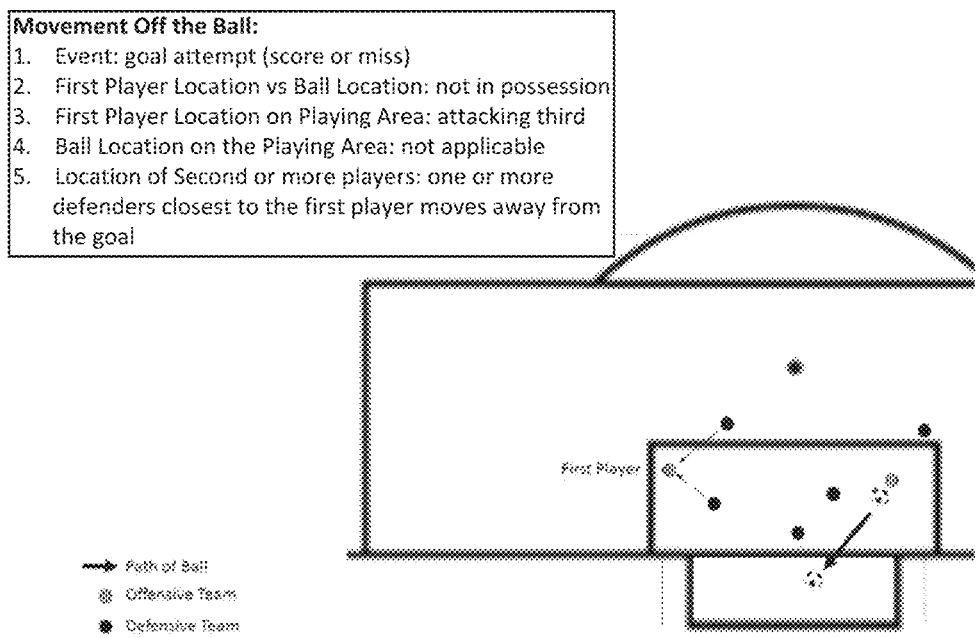
FIG. 18 shows the process for determining Movement 'Oft the Ball' in soccer striker.

To further assist this; the software can place the ball in a series of locations on a representation of the playing area on a computer screen or similar and the coach then places the players in the desired relative locations with regard to this. This would be usually conducted for the team being both in possession and on defence as 'shape' can change depending on this. (see FIG. 18)

6.5 Graphical Real Time Representation

The system highlights situations where the relative locations for each player dependent on the location of the ball matches player desired relative location assignments. (i.e. do not fit in on the continuum of a compacting defence the further back down the field the team is pushed towards their goal.)

7. Further Aspects

7.1 Classification of Player Technical Quality

Using video cameras or location sensors, players can be tracked in terms of their x, y d in some cases 7 location values within a coordinate system on a field. This can be used in classification of player or position technical quality.

By way of example, the following technical abilities of a striker in soccer can be assessed automatically during a game from data:

1. Finishing (Finishing a 'sitter', Finishing a Long Sitter, Finishing a tricky goal)
2. Assists
3. Anticipation
4. Vision in the Build Up
5. Movement off the ball
6. Composure
7. Speed
8. Positions This does not preclude classification and analysis of other positions in Soccer or class cation of other sports and players of different positions in other sports using different classification criteria more suitable to the sport and player position.

Although goals scored and assists have commonly been used in sports analysis the details of the qualities of these skills have not been determined previously.

The player skill qualities of Anticipation, Vision in the Build Up, Movement off the ball, Composure and Positioning have not been determined previously.

7.2 Finishing

Finishing involves the ability to 'finish' an offensive build up with scoring a goal. There are several different types of finishing from scoring an easy goal through to more complicated situations where scoring a goal requires more skill. There are 3 types of Finishing that can be classified. These are; Finishing a Short Sitter, Finishing a Long Sitter and Finishing a Tricky Goal.

In some cases the classification requires an initiator which is something detected that tells the system to make a classification which could be a game event like a goal scored. In this case, it is that:

1. the ball or game object went out over the goal or scoring line
2. within a zone where the maximum distance either side of the goal mouth where the ball crossed the goal line was no more than 1.5 meters outside of either goal post
3. and the last touch was an offensive first player which defines a shot at goal.

Here are the classifications that define the quality and therefore skill of the shot at goal if a goal is scored:

a) Finishing a Short 'Sitter'

The classification criteria are that: the shooting first player is behind the opposition defence (on the wrong side of the defence) and therefore with only the goal keeper in front of the goal shooting first player. This occurs in the playing area of the field known as the 6 yard box with no opposition defensive player within 3 meters of the shooting player. The goal keeper and defensive players make up at leas a second or more players.

Terms like the 6 yard box are based on a set of reference location values within a coordinate system for the playing area.

Figure 11:
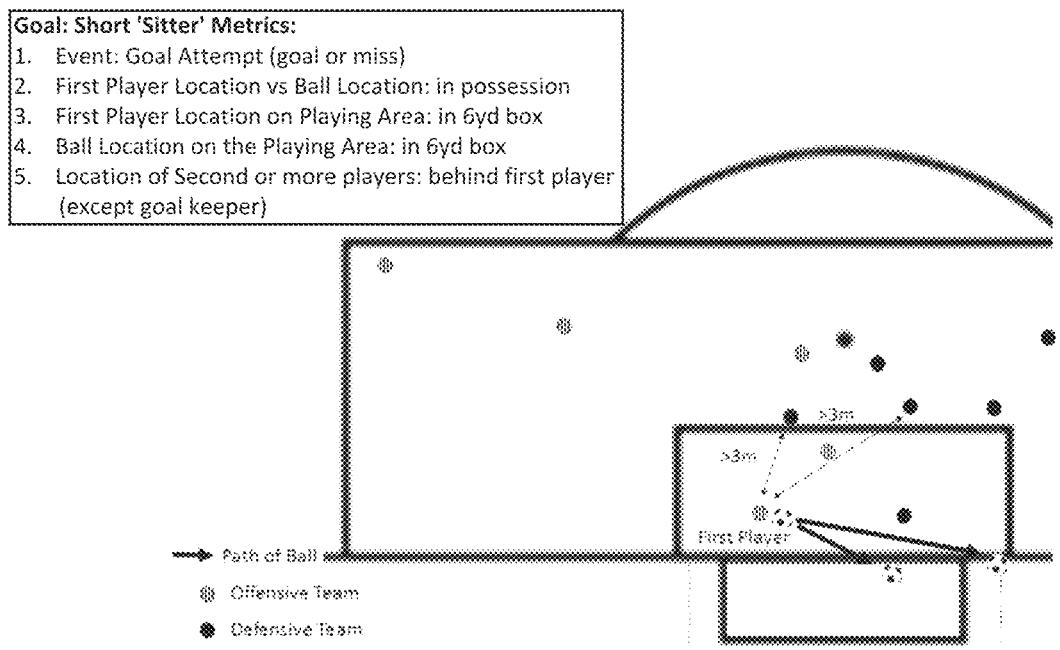
FIG. 11 shows the process for determining a Short 'Sitter' goal in soccer for a striker.

The analysis is based on whether a goal was scored. Possible outcomes are missing the shot at goal or scoring a short 'sitter'. Further analysis can be made once this classification is made, Classification:
i. Playing Event: a shot at goal is made
ii. Offense/Defense: not applicable
iii. First Player Location in relation to location of the Ball: the goal shooting player is in possession
iv. First Player Location on the Field: in the 6 yard box
v. Ball Location on the field: in the 6 yard box
vi. Location of Other Players (Second or more players): all opposition defensive players are behind the shooting player except for the goal keeper who is in front of the shooting first player. At times the goal keeper may also be behind the shooting player. All opposition defensive players are more than 3 meters away from the shooting player. The goal keeper and all defensive players make up at least a second or more players.
See FIG. 11.

b) Finishing a Long 'Sitter'

In this case, a long 'sitter' is exactly the same as a short 'sitter' except the goal shooting first player is not inside the 6 yard box but is within the 18 yard box. When the goal shot was taken the shooting first player was behind the defensive players and therefore only had the goal keeper in front of them. No defensive player was within 3 meters of the shooting player. Sometimes the goal keeper would also be behind the shooting player meaning no player was in front of the shooting first player. The goal keeper and defensive players make up at least a second or more players.

Terms like the 6 yard box are based on a set of reference location values within a coordinate system for the playing area.

The analysis is based on whether a goal was scored. Possible outcomes are missing the shot at goal or scoring a long 'sitter'. Further analysis can be made once this classification is made.

Figure 12:
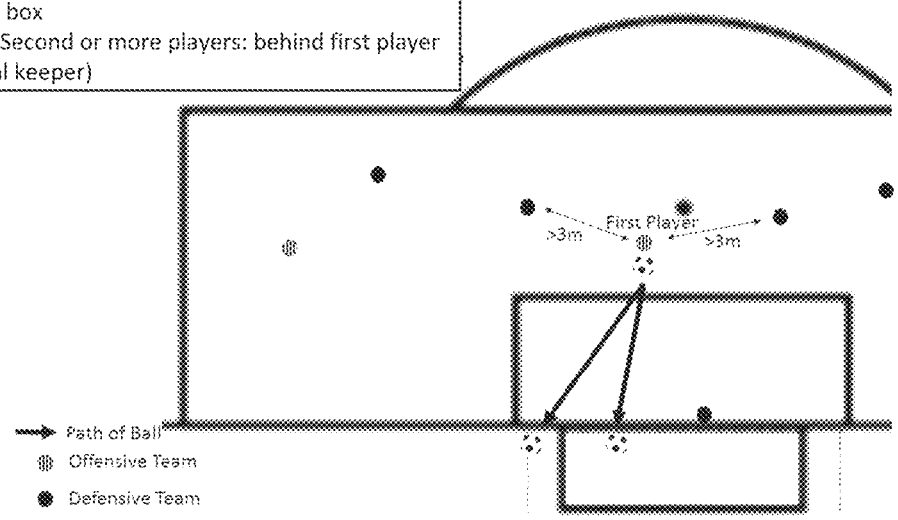
FIG. 12 shows the process for determining a Long 'Sitter' goal in soccer for a striker.

Classification:
i. Playing Event: a shot at goal is made
ii. Offense/Defense: not applicable
iii. First Player Location in relation to location of the Ball: the goal shooting first player is in possession
iv. First: Player Location on the Field: outside the 6 yard box but inside the 18 yard box
v. Ball Location on the field: outside the 6 yard box but inside the 18 yard box
vii. Location of Other Players (second or more players): all opposition defensive players are behind the shooting first player except for the goal keeper who is in front of the shooting player. At times the goal keeper may also be behind the shooting player. All opposition defensive players are more than 3 meters away from the shooting player. The goal keeper and all defensive players make up at least a second or more players.
See FIG. 12.

c) Finishing a Tricky Goal

The classification is where the ball went out over the goal line with a zone where the maximum distance either side of the goal mouth is no more than 1.5 meters outside of either goal post as it crosses the goal line. The last touch or kick was from an offensive first player which defines a shot at goal but the shot was not a Long or Short Sitter classification.

The analysis is based on whether a goal was scored. Possible outcomes are missing the shot at goal or scoring a Tricky Goal. Further analysis can be made once this classification is made.

Figure 13:
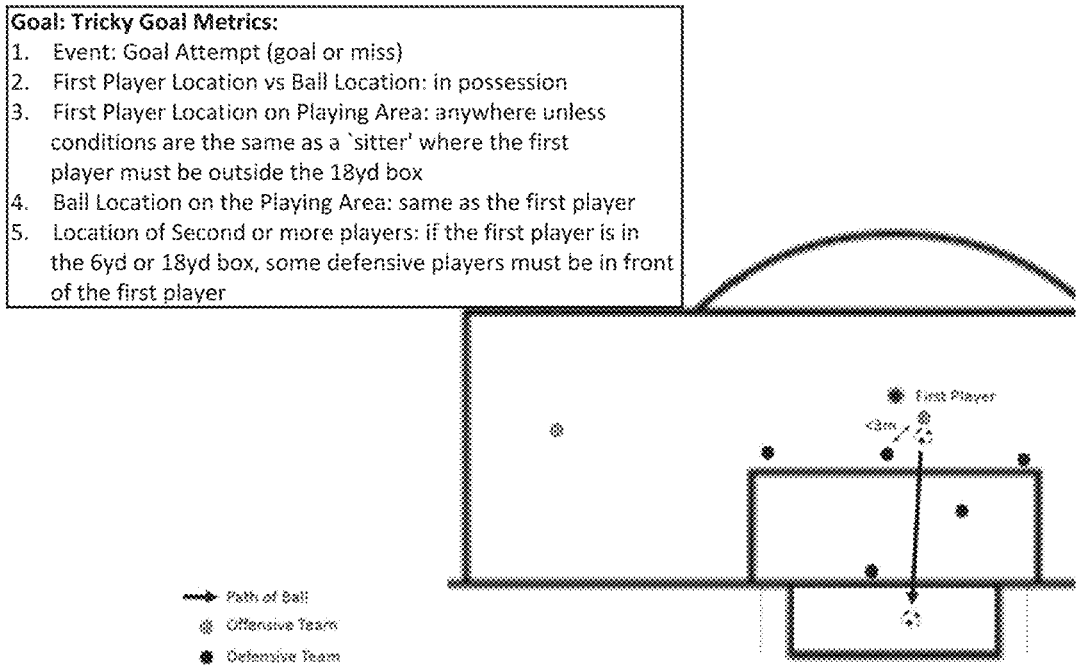
FIG. 13 shows the process for determining a Tricky goal in soccer for a striker.

Classification:
i. Playing Event: a shot at goal is made
ii. Offense/Defense: not applicable
iii. First Player Location in relation to location of the Ball: the goal shooting first player is in possession
iv. First Player Location on the Field: can be anywhere unless the location of the defensive players is the same as a 'sitter; and then it must be outside both the 6 yard and 18 yard boxes.
v. Ball Location on the field: can be anywhere unless the location of the defensive players is the same as a 'sitter; and then it must be outside both the 6 yard and 18 yard boxes
vi. Location of Other Players (second or more players): if the attacking first player is in the 6 yard or 18 yard box, some defensive players other than the goal keeper must be in front of the player and/or some within less than 3 meters away from the player. The goal keeper and defensive players make up at least a second or more players. Terms like the 6 and 18 yard box are based on a set of reference location values within a coordinate system for the playing area.
See FIG. 13

7.3 Assists

Assists are where the second to last touch of the ball by an offensive team is followed by them scoring a goal. This is to determine how often a striker creates an opportunity to score a goal even when they don't score the goal themselves. A strong ability to set up goals can be argued to be as useful as scoring goals so this technical ability needs to be measured.

Once a goal is scored the system automatically goes back in game clock time to find the second to last touch to see who provided the assist and this player is acknowledged an assist.

Once again, the classification requires an initiator and this is that the ball went out over the goal line within a zone where the maximum distance either side of the goal mouth was no more than 1.5 meters outside of either goal post as it crosses the goal line and the last touch was an offensive player which defines a shot at goal.

There are two kinds of assists; Low Quality Assists and High Quality Assists a) Low Quality Assist In this classification situation, when the assisting player provides the second to last touch, the opposition cover defence were further away from the goal than the scoring player, when the assisting first player passed the ball to the successful goal shooter.

The analysis is the pace of the passed ball with a faster ball being harder to pass accurately and more trouble to the defence than a slower passed ball. (<20 km/hr)

The other measure is the scoring player's time with the ball before shooting which helps to measure the accuracy of the passing assist and the assisting first player's ability to read open space on the field.

Figure 14:
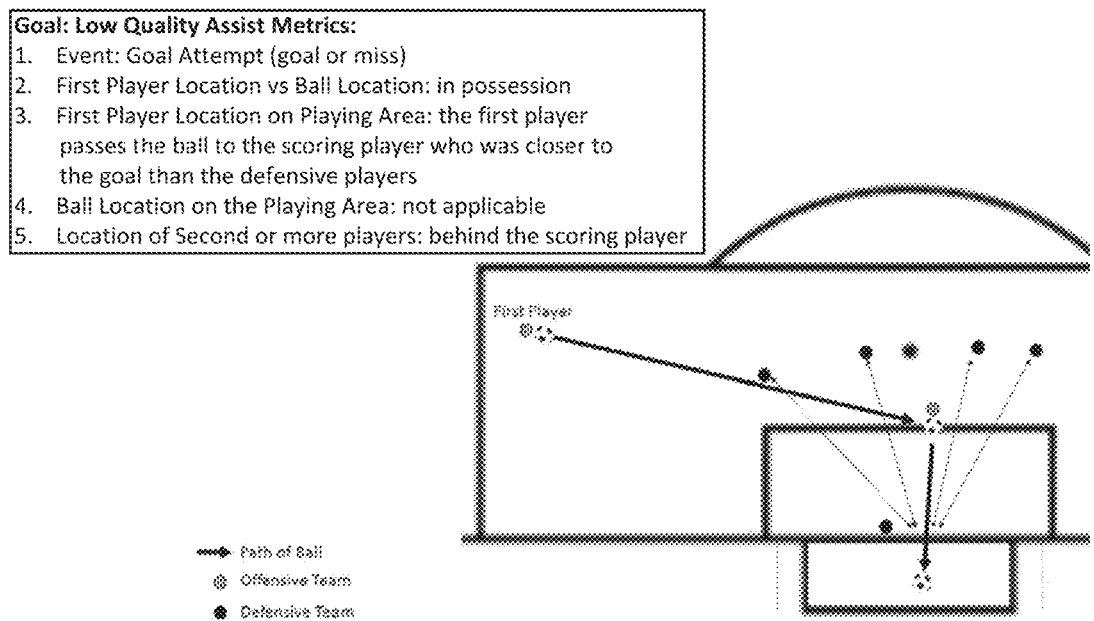
FIG. 14 shows the process for determining a Low Quality Assist in soccer for a striker.

Classification:
i. Playing Event: a goal was scored
ii. Offense/Defense: the assisting first player's team is in possession
iii. First Player Location in relation to location of the Ball: The assisting first player was in possession immediately before the scoring players possession and was closest to the ball which also changed direction or speed.
iv. First Player Location on the Field: not applicable
v. Ball Location on the field: not applicable
vi. Location of Other Players (second or more players): once a goal is scored, the scoring player who the ball was passed to, was closer to the goal than the defensive players The scoring player and all defensive players make up at least a second or more players.
See FIG. 14 b) High Quality Assist

A high quality assist is a more difficult pass that results in another player scoring a goal. After a goal is scored, the second to last touch was from an offensive assisting first player located where opposition defensive players are closer to the goal than the scoring player.

The analysis is the pace of the passed ball with a faster ball being harder to pass accurately and more trouble to the defence than a slower passed ball. (<20 km/hr)

The other measure is the scoring player's time with the ball before shooting which helps to measure the accuracy of the passing assist and the assisting first player's ability to read open space on the field.

Figure 15:
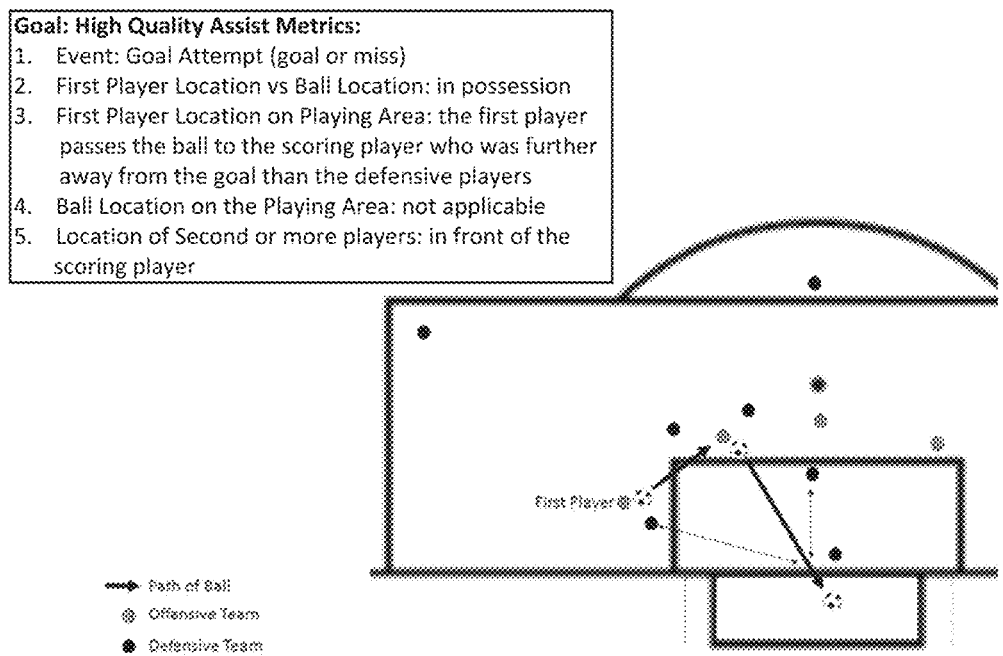
FIG. 15 shows the process for determining a High Quality Assist in soccer for a striker.

Classification:
i. Playing Event: a goal was scored
ii. Offense/Defense: the reference first player's team is in possession
iii. First Player Location in relation to location of the Ball: The assisting first player is in possession immediately before the scoring players possession and was closest to the ball which also changed direction or speed.
iv. First Player Location on the Field: not applicable
v. Ball Location on the field: not applicable
vi. Location of Other Players: once a goal is scored, the goal scoring player who the ball was passed to was further away from the goal than the opposition defensive players.
The scoring player and all defensive players make up at least a second o more players.
See FIG. 15

7.4 Anticipation

Anticipation is the ability to read the game and be where the ball will be next rather than where the ball is now, Ice Hockey great, Wayne Gretztky once said that he skates to where the puck is going to be, not where it is. This is good anticipation that often separates the good from the great players and is therefore worth measuring.

For a striker in soccer, this can be when the ball is kicked by a player from the attacking team behind the oppositions defence to be received by attacking striker running on to the ball. A striker that can execute this effectively and often will be very dangerous in terms of scoring goals.

In this classification, the ball is kicked by the attacking team behind or in line with the average location of the nearest 2 defenders in relation to the striker and where it is received by the attacking striker in the attacking third of the field. The striker is running faster than the nearest two players in the defensive line which is 140% of the defensive players speed and the attacking strikers pick up possession of the ball behind or level to the average location of the nearest two defenders to the ball. The goal keeper is not included in this. The attacking striker is not deemed off side when the ball is passed.

The analysis is that a goal was scored (the ball went into the goal) or a goal shot attempt was made. (The ball narrowly missed the goal.)

A goal shot attempt was made where the ball went out over the goal line within a zone where the maximum distance either side of the goal mouth was no more than 1.5 m outside of either goal post as it crosses the goal line and the last touch was an offensive player which defines a shot at goal.

Further analysis is to determine whether this resulted in an offensive corner or throw in.

Figure 16:
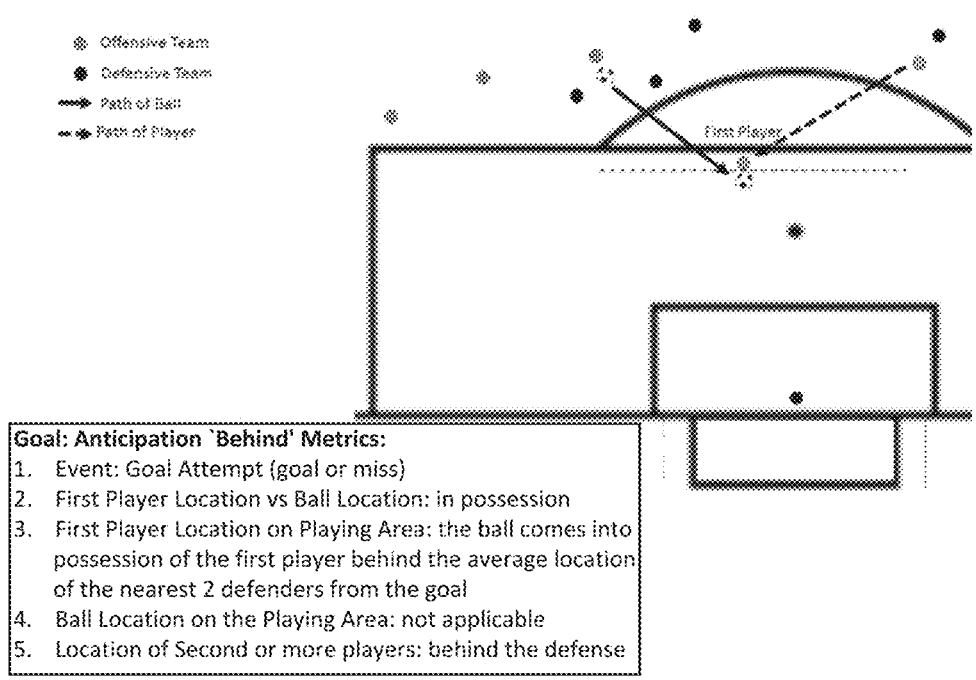
FIG. 16 shows the process for determining Anticipation in soccer for a striker for a 'behind' situation.

Classification:
i. Playing Event: a goal shot attempt was made
ii. Offense/Defense: the reference first player's team is in possession
iii. First Player Location in relation to location of the Ball; the ball comes into possession of the reference first player either behind the nearest 2 defenders or in line with the average location of the nearest 2 defenders.
iv. First Player Location on the Field: attacking third
v. Ball Location on the field: attacking third
vi. Location of Other Players (second or more players): the reference first player is either behind the nearest 2 opposition defenders or in line with the average location of the nearest 2 opposition defenders.
The defensive or opposition players make up at least a second or more players.
See FIG. 16

7.5 Vision in the Build up

This classification describes the striker's ability to create space around them to receive the ball passed by another player from their team. Space is described as a comfortable distance between the reference first player and all other players so that passing and receiving of the ball is less under pressure for losing possession.

The only classification is that the first player receives the ball and data is analysed based on this. The classifications could be broken down into the defensive third, middle third and attacking thirds of the field.

The analysis is the measure of amount of space (distance from other players) when the ball was received (square meters), the success of the pass to next player in terms of whether the receiving player received the ball, the space the player the ball was passed to had in terms of distance from other opposition players.

Classification:
i. Playing Event: a pass was made (the ball moved from one player to another or players on the same team).
ii. Offense/Defense: the reference first player's team is in possession
iii. First Player Location in relation to location of the Balk the ball comes into possession of the reference first player
iv. First Player Location on the Field: not applicable
v. Ball Location on the field: not applicable vi. Location of Other Players (second or more players): the defensive players are far enough away from the first player that the first player maintains accurate passing and receiving of the ball.

The defensive or opposition players make up a least a second or more players.

Figure 17:
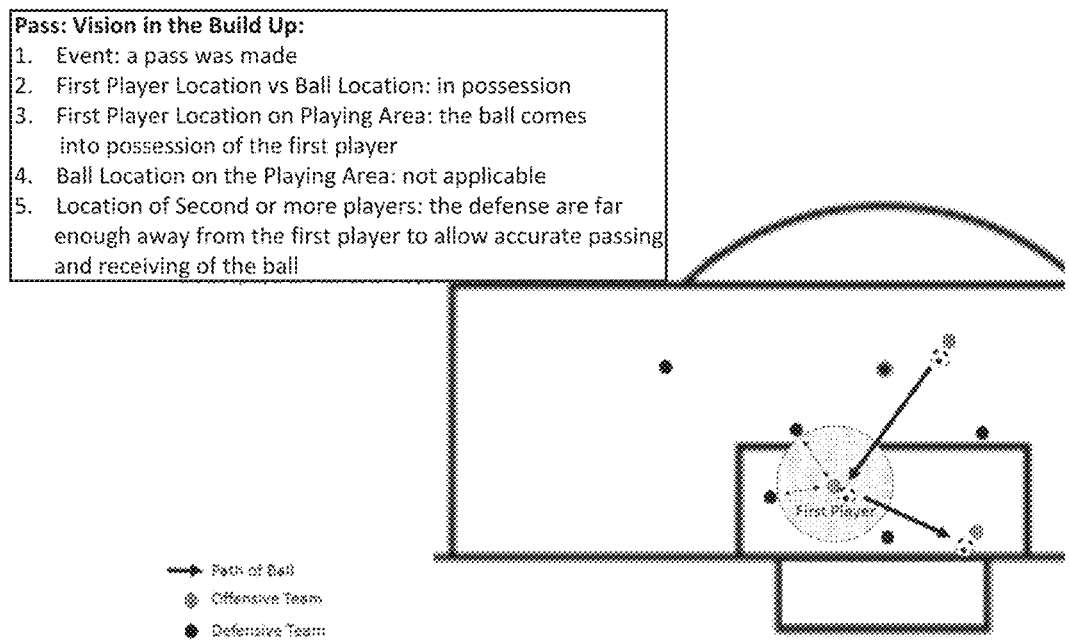
FIG. 17 shows the process for determining Vision in soccer for a striker.

See FIG. 17

7.6 Movement Off the Ball

Movement off the ball is a measure to see if the offensive striker contributed to a goal being scored by pulling opposition defenders away from their effective defence formation.

The initiator in terms of detection for this classification is that the ball went out over the goal line (in the penalty box) or a Finishing Sitter occurred.

A goal shot attempt was made where the ball went out over the goal line within a zone where the maximum distance either side of the goal mouth no more than 1.5 meters outside of either goal post as it crosses the goal line. The last touch was an offensive player which defines a shot at The classification is that the reference first player was in the attacking third and took one or more defensive opposition players further away from the goal or the defensive formation broke (the distance between 1 or more defensive players changed.) This situation occurred 5 or less seconds before the goal was scored.

The analysis is based on whether a goal was scored, an offensive corner or throw in were given.

Classification:
i. Playing Event: a goal shot attempt was made
ii. Offense/Defense: the reference first player's team is in possession
iii. First Player Location in relation to location of the Balk the reference layer is not in possession of the ball
iv. First: Player Location on the Field: the attacking third
v. Ball Location on the field: not applicable
  Location of Other Players (second or more players): one or more defenders closest to the reference first player moved further away from the goal measured by a vector or the defensive formation changed. (The distance between 1 or more defensive players changed.) This occurred within 5 seconds of the goal being scored.
  The defensive or opposition players make up a least a second or more players.
  See FIG. 18

7.7 Composure

Composure measures the players ability to be calm and in control under pressure. In this case pressure is based on the proximity and number of defenders in relation to the first player. It is the striker's ability to pull players in and tie them up defensively without losing the ball.

The initiator is that the first player receives the ball in the attacking third with 2 or more defenders within 3 meters of the first player with the ball.

The classification is that the attacking striker or first player is in possession of the ball for a period of time that is longer than 5 seconds and less than 10 seconds where there are 2 or more opposition defensive players within 3 meters of the offensive striker.

The analysis involves the accuracy of the pass that was made following this (another player on the offensive team came into possession), the number of players within 3 meters, and the length of time the player held the ball for.

Figure 19:
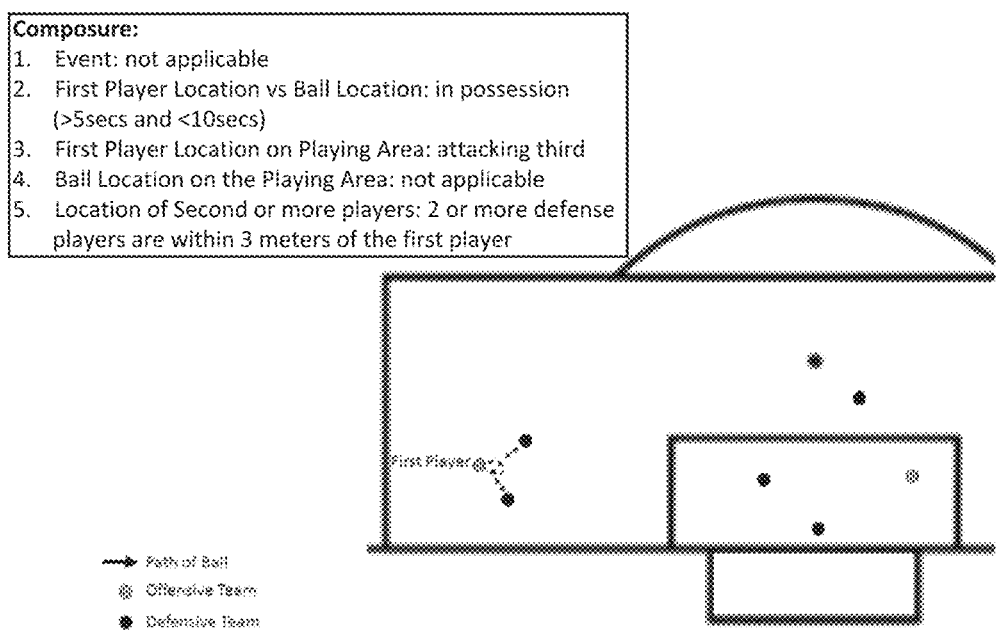
FIG. 19 shows the process for determining Composure in soccer for a striker.

Classification:
i. Playing Event: not applicable
ii. Offense/Defense: the reference first player's team is in possession
iii. First Player Location in relation to location of the Ball: the reference first player is in possession (for more than 5 seconds and less than 10 seconds)
iv. First Player Location on the Field: in the attacking third
v. Ball Location on the field: in the attacking third
vi. Location of Other Players (second or ore players): 2 or more opposition defensive players are within 3 meters of the attacking reference player who is in possession
  The defensive or opposition players make up at least a second or more players.
  See FIG. 19

8 Definitions for Sensor Types

It is envisaged that the system is configurable to work with different types of special purpose sensors. It may occur also that the system utilizes data from sensors from several different devices as is the case with using a smart phone with internal GPS and heart rate data from a Garmin ANT+ heart rate monitor strap and a stride rate data from an Adidas Speedcell footpod using the ANT+ transmission protocol to send data to the phone.

There are 3 forms of sensor methods; data recorded by a device worn by the player for post activity download, data measured on a device by a player and transmitted in real time to a base station or data gathered by triangulation of the location of a player and recorded at a base station on the side of the field or court for example.

a) Data Recorded on a Device Worn by a Player

Sensors worn by the player that record data include the Adidas Speedcell and the Bemeister soccer system. The Adidas Speedcell is the most simple with a footpad worn internally in a player's boot which contains an accelerometer with a number of algorithms that can determine speed and stride rate. This system can use the ANT+ transmission protocol to transmit data to an iphone for real time representations of data or can be plugged into a computer for download post game or training session.

The Bemeister system involves a foot pod inserted into the player's boot which sends speed data to a wrist watch and a ball that contains a sensor which also sends data to the watch. The watch can be downloaded to a computer post game or workout.

Other systems by GPSports, Zephyr and Catapult sports carry GPS tracking, magnetometers, accelerometers, gyroscopes, and heart rate sensors worn by players during training and games.

b) Data Gathered by Sensors and Transmitted to a Base Station in Real Time

Some more sophisticated systems like the Adidas micoach elite team system has players wearing purpose built clothing that has heart rate, and speed sensors contained in a pod inserted into the back of a compression under garment that use sophisticated algorithms to calculate power and acceleration. This data is transmitted in real time to a base station for real time data analysis.

c) Data Gathered by Triangulation

Over time there have been several methods that have used transponders worn by players sending data on location in real time to receivers set around a playing field that triangulate player locations but these have been less successful.

However, what has been very successful are systems that use video footage for assessment of location of players. There are several systems in operation being Vistrak in Germany, Sportvu in the United States and Prozone in the United Kingdom. All systems require a number of video camera's placed at different locations and angles around a playing field, court or rink. These systems are connected together and use algorithms combined with the different angles of the cameras to triangulate location of each player on the field as an x (latitude), y (longitude) and a (vertical) coordinate over time.

The invention disclosed is based on assessment of location and any team monitoring system that provides location data on players and if possible the ball can utilise the disclosed invention.

9 System Requirements

It will be appreciated that the system of the invention may be implemented on any suitable hardware system, platform or architecture. The hardware system may be provided on-board device used by the user or on a remote server for example, and preferably comprises at least a processor for running the classification system and in particular the algorithms, at least one memory component for storing at least the algorithms and the threshold criteria, and interface circuitry for communicating with external components that either directly or indirectly provide sensor output data. It will be appreciated that the processor may be any form of programmable hardware device, whether a CPU, Digital Signal Processor, Field-Programmable Gate Array, Microcontroller, cation-Specific Integrated Circuit, or the like.

There are 3 possible configurations for housing the classification system.

The data is processed 'on board' a measurement device (i.e. the classification system is within the measurement/monitoring device), Data is processed via manual (controlled by user) or automatic transfer (upload and download) data via a communications network (e.g. telecommunications, wifi etc) to a remote server that contains the classification system, or manual or automatic transfer of data to a computer that either contains the system or that transfers (upload and download) the data to a remote server that contains the system.

The system may house the infrastructure for the classification and allow a person, trainer or coach to input the one or more parameters and/or the one or more associated thresholds that define an activity.

Figure 20:
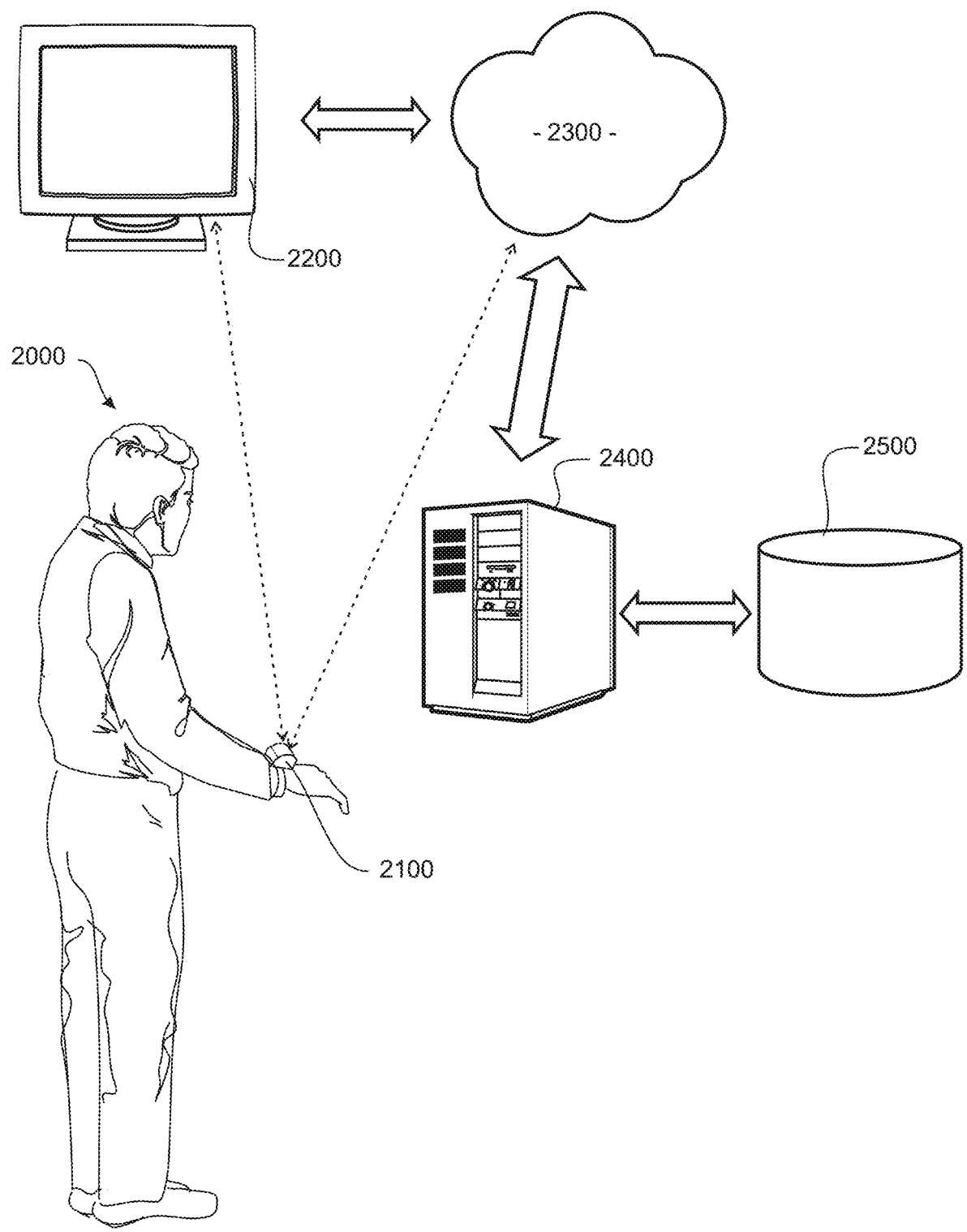
FIG. 20 is a block diagram showing the components associated with the system of the invention.

FIG. 20 shows an exemplary diagram of a user 2000 exercising or engaging in one or more activities during a game whilst wearing one or more parameter sensing devices 2100 (which can be any combination of devices as explained in the sensor types section above). The device(s) 2100 collect information on the activity session and in particular data streams associated with the parameters required to classify the activities performed during the user's exercise/activity session. The device(s) 2100 may automatically process the data 'on board' (or manually when the user prompts the device to process the data for example) if the classification system is housed within the monitoring device(s). Alternatively or in addition the data may be automatically sent over to an analysis system 2400 (which may reside in a remote server or a home computer), either wirelessly or via cables, and if sent to a remote server preferably e.g. via a network. Instead of automatic transmission of the data, the user may upload the data manually to a home computer 2200 connected to the analysis system 2400 via a network 2300 or even directly to a remote server where the analysis system resides. The system (whether in the monitoring device, personal computer or remote server or elsewhere) processes the data by accessing memory 2500 (again this may be in the monitoring device, personal computer or remote server and is not necessarily in the same place as the processing circuitry) containing the classification system algorithms and threshold criteria (and preferably user information) to determine the activities conducted and the level of performance as described above. The system 2400 may then interpret this data, and any other activity data provided by the devices 2100 to provide feedback to the user and/or alter a training program stored in memory 2500. The analysis system 2400 may communicate to the user's computer or devices 2100 via any communication means known in the art.

Figure 21:
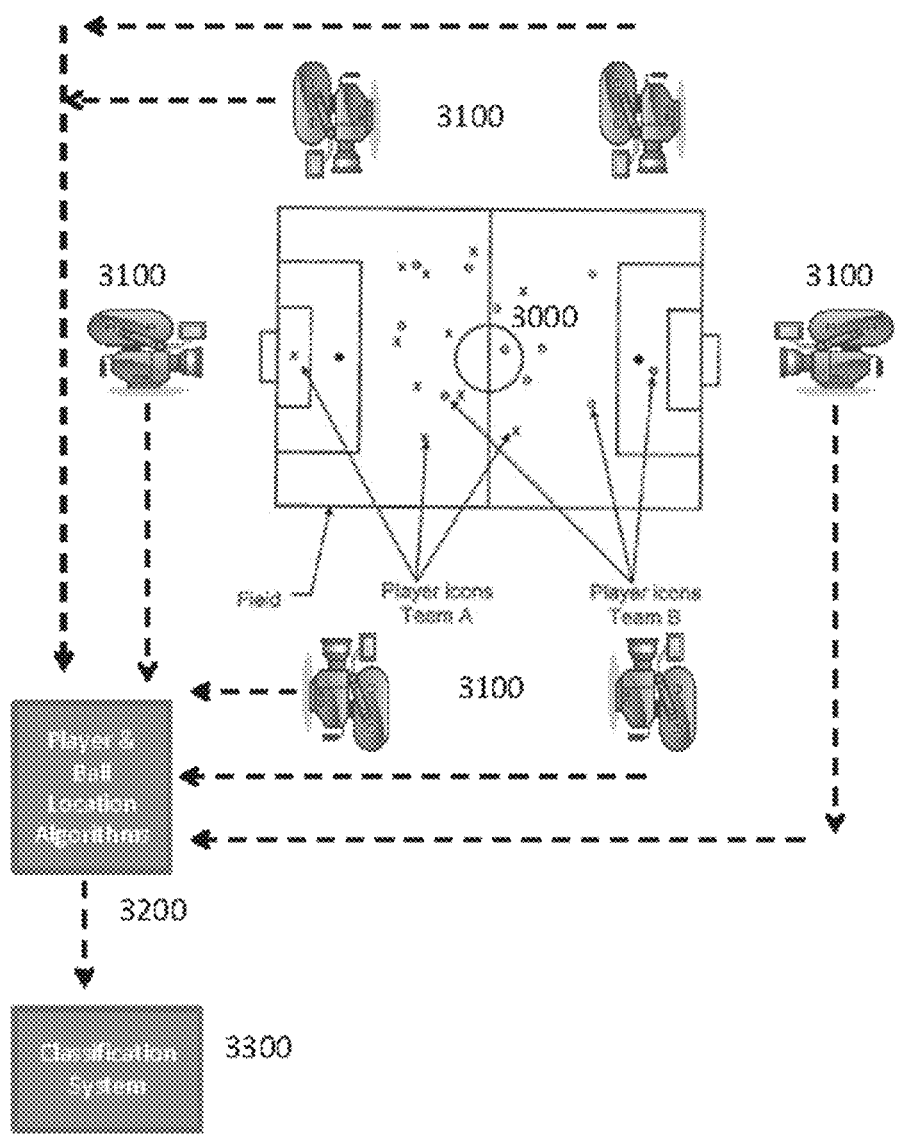
FIG. 21 is a block diagram shoving the components associated with the system of the invention.

Another configuration of the method is shown in FIG. 21 where location of players on a field, court or playing area 3000 is triangulated by video cameras 3100 placed around the playing area and the locations of each player per time period are identified by algorithms that combine the video data to determine location 3200. This data is then supplied to the classification system 3300 which then analyses the data.

The invention is also intended to cover a method of analysing an exercise session or game as employed by the system described above.

The foregoing description of the invention includes preferred forms thereof. Modifications may be made thereto without departing from the scope of the invention.

What is claimed is:

1. A method comprising:
   receiving location data associated with a first player and location data associated with a second player, wherein the location data of the first player and the location data of the second player are derived from one or more sensor devices;
   detecting, by a computer comprising one or more processors, a game event associated with the first player;
   determining, in view of the received location data, a plurality of locations of the first player and at least one location of the second player; and
   classifying, by the computer comprising the one or more processors, the game event based on the plurality of locations of the first player and the at least one location of the second player.

2. The method of claim 1, wherein detecting the game event comprises detecting at least one of a goal, an assist, a pass, a possession change, an off side infraction, or a game object exceeding a boundary of a playing area.

3. The method of claim 1, wherein detecting the game event comprises detecting the game event based on location data associated with a game object and location data associated with a scoring area.

4. The method of claim 1, further comprising receiving user input data, and wherein classifying the game event is based on the user input data.

5. The method of claim 1, wherein the first player comprises an offensive player and the second player comprises a defensive player, and further comprising determining a relative location of the offensive player in relation to the defensive player by calculating a geo spatial relationship between the offensive player and the defensive player.

6. The method of claim 5, further comprising detecting that the offensive player is closer to a scoring area than the defensive player, and wherein the relative location of the offensive player in relation to the defensive player exceeds a predetermined threshold distance.

7. The method of claim 5, further comprising detecting that the defensive player is closer to a scoring area than the offensive player, and wherein the relative location of the offensive player in relation to a location of the defensive player is within a predetermined threshold distance.

8. The method of claim 1, wherein the classifying comprises classifying the game event as a first game event based on the first player being within a penalty box and outside a goal box.

9. The method of claim 1, wherein the classifying comprises classifying the game event as a second game event based on the first player being within a penalty box and within a goal box.

10. The method of claim 1, further comprising determining a relative location based on the first player and a game object and a relative location based on the second player and the game object.

11. The method of claim 9, further comprising transmitting an alert to a user, the alert corresponding to the first player and being based on at least one of the relative locations that are based on the game object.

12. The method of claim 1, further comprising:
detecting a pass to the first player from a third player, the pass occurring prior to the game event;
determining the first player is closer to a scoring area than the third player at a time of the pass; and
further classifying the game event based on the detected pass from the third player and on the determining the first player is closer.

13. The method of claim 1, further comprising:
detecting a pass to the first player from a third player, the pass occurring prior to the game event;
determining the first player is further from a scoring area than the third player at a time of the pass; and
further classifying the game event based on the detected pass from the third player and on the determining the first player is further.

14. The method of claim 5, further comprising:
detecting a pass to the offensive player, the pass occurring prior to the game event;
determining the offensive player at a time of the pass is closer to a scoring area than an average distance from the scoring area of a plurality of defensive players; and
further classifying the game event based on the detected pass and on the determining the offensive player is closer.

15. The method of claim 5, further comprising:
detecting a first game event comprising a first pass to a second offensive player, the first pass occurring at a first time prior to the game event;
detecting a second game event comprising a second pass from the second offensive player to the offensive player, the second pass occurring at a second time prior to the game event;
determining the second offensive player is at least a predetermined threshold distance away from all defensive players between the first time and the second time; and
further classifying the game event associated with the offensive player based on the detected first game event and second game event.

16. The method of claim 5, further comprising:
detecting the defensive player is closer to a second offensive player than all other defensive players;
determining the defensive player is moving away from a scoring area at a time of the game event associated with the first player, wherein the game event comprises a goal; and
further classifying the game event based on the determined defensive player moving away from the scoring area.

17. The method of claim 5, further comprising:
determining the offensive player possesses a game object for a time period exceeding a predetermined threshold duration; and
detecting a plurality of defensive players are within a predetermined threshold distance from the offensive player during the time period.

18. A non-transitory machine-readable storage medium comprising instructions that cause a computer comprising one or more processors to:
receive location data associated with a first player and location data associated with a second player, wherein the location data of the first player and the location data of the second player are derived from one or more sensor devices;
detect a game event associated with the first player;
determine, in view of the received location data, a plurality of locations of the first player and at least one location of the second player; and
classify the game event based on the plurality of locations of the first player and the at least one location of the second player.

19. The non-transitory machine-readable storage medium of claim 18, wherein to detect the game event the one or more processors are to detect at least one of a goal, an assist, a pass, a possession change, an off side infraction, or a game object exceeding a boundary of a playing area.

20. The non-transitory machine-readable storage medium of claim 18, wherein the first player comprises an offensive player and the second player comprises a defensive player, and wherein the one or more processors further to determine a relative location of the offensive player in relation to the defensive player by calculating a geo spatial relationship between the offensive player and the defensive player.

21. The non-transitory machine-readable storage medium of claim 20, wherein the one or more processors are further to detect that the offensive player is closer to a scoring area than the defensive player, and wherein the relative location of the offensive player in relation to the defensive player exceeds a predetermined threshold distance.

22. The non-transitory machine-readable storage medium of claim 18, wherein to classify the game event the one or more processors are to classify the game event as a first game event based on the first player being within a penalty box and outside a goal box.

23. The non-transitory machine-readable storage medium of claim 18, wherein the one or more processors are further to transmit an alert to a user, the alert corresponding to the first player and being based on at least one of the plurality of locations.

24. The non-transitory machine-readable storage medium of claim 18, wherein the one or more processors are further to:
detect a pass to the first player from a third player, the pass occurring prior to the game event;
determine the first player is closer to a scoring area than the third player at a time of the pass; and
further classify the game event based on the detected pass from the third player and on the determining the first player is closer.

25. The non-transitory machine-readable storage medium of claim 18, wherein the one or more processors are further to:
detect a pass to the first player from a third player, the pass occurring prior to the game event;
determine the first player is further from a scoring area than the third player at a time of the pass; and
further classify the game event based on the detected pass from the third player and on the determining the first player is further.

26. The non-transitory machine-readable storage medium of claim 20, wherein the one or more processors are further to:
detect a pass to the offensive player, the pass occurring prior to the game event;
determine the offensive player at a time of the pass is closer to a scoring area than an average distance from the scoring area of a plurality of defensive players; and
further classify the game event based on the detected pass and on the determining the offensive player is closer.

27. The non-transitory machine-readable storage medium of claim 20, wherein the one or more processors are further to:
detect a first game event comprising a first pass to a second offensive player, the first pass occurring at a first time prior to the game event;
detect a second game event comprising a second pass from the second offensive player to the offensive player, the second pass occurring at a second time prior to the game event;
determine the second offensive player is at least a predetermined threshold distance away from all defensive players between the first time and the second time; and
further classify the game event associated with the offensive player based on the detected first game event and second game event.

28. The non-transitory machine-readable storage medium of claim 20, wherein the one or more processors are further to:
detect the defensive player is closer to a second offensive player than all other defensive players;
determine the defensive player is moving away from a scoring area at a time of the game event associated with the first player, wherein the game event comprises a goal; and
further classify the game event based on the determined defensive player moving away from the scoring area.

29. The non-transitory machine-readable storage medium of claim 20, wherein the one or more processors are further to:
determine the offensive player possesses a game object for a time period exceeding a predetermined threshold duration; and
detect a plurality of defensive players are within a predetermined threshold distance from the offensive player during the time period.

30. A computer system comprising:
a memory; and
one or more processors communicably coupled to the memory, the one or more processors to:
receive location data associated with a first player and location data associated with a second player, wherein the location data of the first player and the location data of the second player are derived from one or more sensor devices;
detect, by the one or more processors, a game event associated with the first player;
determine, in view of the received location data, a plurality of locations of the first player and at least one location of the second player; and
classify the game event based on the plurality of locations of the first player and the at least one location of the second player.

* * * * *